United States Patent
Fang et al.

(10) Patent No.: US 12,311,970 B2
(45) Date of Patent: May 27, 2025

(54) METHOD AND APPARATUS FOR TRAJECTORY PREDICTION, DEVICE AND STORAGE MEDIUM

(71) Applicants: SENSETIME GROUP LIMITED, Hong Kong (CN); HONDA MOTOR CO. LTD., Tokyo (JP)

(72) Inventors: Liangji Fang, Hong Kong (CN); Qinhong Jiang, Hong Kong (CN); Jianping Shi, Hong Kong (CN)

(73) Assignees: SENSETIME GROUP LIMITED, Hong Kong (CN); HONDA MOTOR CO., LTD., Tokyo (JP)

( * ) Notice: Subject to any disclaimer, the term of this patent is extended or adjusted under 35 U.S.C. 154(b) by 546 days.

(21) Appl. No.: 17/703,268

(22) Filed: Mar. 24, 2022

(65) Prior Publication Data

US 2022/0212693 A1    Jul. 7, 2022

Related U.S. Application Data

(63) Continuation of application No. PCT/CN2021/085448, filed on Apr. 2, 2021.

(30) Foreign Application Priority Data

Apr. 10, 2020    (CN) .......................... 202010279772.9

(51) Int. Cl.
*B60W 60/00* (2020.01)

(52) U.S. Cl.
CPC ... *B60W 60/0011* (2020.02); *B60W 2420/403* (2013.01); *B60W 2552/05* (2020.02); *B60W 2554/4029* (2020.02); *B60W 2555/60* (2020.02)

(58) Field of Classification Search
None
See application file for complete search history.

(56) References Cited

U.S. PATENT DOCUMENTS 10,133,275 B1 * 11/2018 Kobilarov ......... B60W 60/0016
10,309,792 B2 *  6/2019 Iagnemma ......... G01C 21/3461
(Continued)

FOREIGN PATENT DOCUMENTS

CN    105809714 A    7/2016
CN    108803617 A    11/2018
(Continued)

OTHER PUBLICATIONS

English translation of the Written Opinion of the International Search Authority in the international application No. PCT/CN2021/085448, mailed on Jul. 8, 2021, 4 pgs.
(Continued)

*Primary Examiner* — Jonathan M Dager
(74) *Attorney, Agent, or Firm* — Cooper Legal Group, LLC

(57) ABSTRACT

Embodiments of the disclosure provide a method and apparatus for trajectory prediction, a device and a storage medium. The method includes that: location information of a reference end point of a moving object is determined according to location information of the moving object; a candidate trajectory set including multiple candidate trajectories is determined according to the location information of the moving object and the location information of the reference end point, wherein location information of an end point of each candidate trajectory is different from the location information of the reference end point; and a target trajectory of the moving object is determined from the candidate trajectory set.

20 Claims, 11 Drawing Sheets

(56) References Cited

U.S. PATENT DOCUMENTS

| | | | | |
|---|---|---|---|---|
| 10,379,538 | B1* | 8/2019 | Sheckells | G05D 1/0217 |
| 10,655,979 | B2* | 5/2020 | Vulcano | G01C 21/3611 |
| 10,860,019 | B2* | 12/2020 | Censi | G05D 1/0257 |
| 11,150,095 | B2* | 10/2021 | Li | G01C 21/3617 |
| 11,199,847 | B2* | 12/2021 | Zhu | G05D 1/0212 |
| 11,231,291 | B2* | 1/2022 | Coleman | G01C 21/3641 |
| 11,370,435 | B2* | 6/2022 | Zhao | G01C 21/3469 |
| 11,487,292 | B2* | 11/2022 | Kumar | G05D 1/0212 |
| 11,755,014 | B2* | 9/2023 | Urtasun | G05D 1/0214 |
| | | | | 701/25 |
| 11,787,438 | B2* | 10/2023 | Houshmand | G05D 1/0038 |
| | | | | 701/2 |
| 11,827,240 | B2* | 11/2023 | Subramanian | B60W 30/12 |
| 11,932,282 | B2* | 3/2024 | Caldwell | G05B 13/0265 |
| 12,030,523 | B2* | 7/2024 | Weiss | G06V 20/584 |
| 2015/0345966 | A1* | 12/2015 | Meuleau | G05D 1/0088 |
| | | | | 701/23 |
| 2018/0120843 | A1 | 5/2018 | Berntorp et al. | |
| 2019/0329771 | A1* | 10/2019 | Wray | B60W 30/18154 |
| 2020/0124435 | A1* | 4/2020 | Edwards | G01C 21/3415 |
| 2020/0160223 | A1* | 5/2020 | McGavran | G06N 5/022 |
| 2020/0160712 | A1* | 5/2020 | Beaurepaire | G08G 1/148 |
| 2020/0240808 | A1* | 7/2020 | Beaurepaire | G01C 21/3461 |
| 2020/0265710 | A1 | 8/2020 | Zhan et al. | |
| 2020/0269843 | A1* | 8/2020 | Wissing | B60W 30/18163 |
| 2020/0290619 | A1* | 9/2020 | Mehdi | B60W 40/04 |
| 2022/0090922 | A1* | 3/2022 | Neumann | G01C 21/3415 |
| 2022/0194419 | A1* | 6/2022 | Houshmand | B60W 60/0023 |
| 2023/0037071 | A1* | 2/2023 | Cunningham | B60W 60/001 |
| 2023/0084578 | A1* | 3/2023 | Sadeghi | B60W 60/0011 |
| | | | | 701/23 |
| 2023/0142676 | A1* | 5/2023 | Zhang | G06T 7/248 |
| | | | | 382/100 |
| 2023/0205208 | A1* | 6/2023 | Hult | G05D 1/0212 |
| | | | | 701/25 |
| 2023/0221128 | A1* | 7/2023 | Collin | B60W 60/001 |
| | | | | 701/25 |
| 2024/0263952 | A1* | 8/2024 | Srinivasan | G08G 1/096866 |
| 2024/0337496 | A1* | 10/2024 | Neumann | G01C 21/3415 |
| 2024/0344839 | A1* | 10/2024 | Moore | G06F 16/29 |

FOREIGN PATENT DOCUMENTS

| | | |
|---|---|---|
| CN | 109272108 A | 1/2019 |
| CN | 109389246 A | 2/2019 |
| CN | 109583151 A | 4/2019 |
| CN | 109739926 A | 5/2019 |
| CN | 110389584 A | 10/2019 |
| CN | 111523643 A | 8/2020 |

OTHER PUBLICATIONS

International Search Report in the international application No. PCT/CN2021/085448, mailed on Jul. 8, 2021, 2 pgs.

Fang Liangji, et al, "TPNet: Trajectory Proposal Network for Motion Prediction", 2020, Liangji Fang, Qinhong Jiang, Jianping Shi and Bolei Zhou, IEEE/CVF Conference on Computer Vision and Pattern Recognition (CVPR), doi:10.1109/cvpr42600.2020.00683, pp. 6796-6805.

* cited by examiner

METHOD AND APPARATUS FOR TRAJECTORY PREDICTION, DEVICE AND STORAGE MEDIUM

CROSS-REFERENCE TO RELATED APPLICATION

This application is a continuation of International Application No. PCT/CN2021/085448, filed on Apr. 2, 2021, which is based on and claims priority to Chinese Patent Application No. 202010279772.9, filed on Apr. 10, 2020. The disclosures of International Application No. PCT/CN2021/085448 and Chinese Patent Application No. 202010279772.9 are hereby incorporated by reference in their entireties.

BACKGROUND

With the development of information technologies, autonomous driving technology has become a hot topic. To realize the autonomous driving technology, trajectory prediction of autonomous vehicles is essential. The accuracy of predicted trajectories decides the safety of the autonomous vehicles.

SUMMARY

Embodiments of the disclosure relate to the field of autonomous driving technology, and relate to, but are not limited to, a method and apparatus for trajectory prediction, a device and a storage medium.

A technical solution of the embodiments of the disclosure is implemented as follows.

The embodiments of the disclosure provide a method for trajectory prediction, which is applied to an electronic device, and may include the following operations.

Location information of a reference end point of a moving object is determined according to location information of the moving object. A candidate trajectory set including multiple candidate trajectories is determined according to the location information of the moving object and the location information of the reference end point. Location information of end points of at least two of the multiple candidate trajectories is different from the location information of the reference end point. A target trajectory of the moving object is determined from the candidate trajectory set.

The embodiments of the disclosure provide an apparatus for trajectory prediction, which may include: a reference end point prediction module, configured to determine location information of a reference end point of a moving object according to location information of the moving object; a candidate trajectory determination module, configured to determine a candidate trajectory set including multiple candidate trajectories according to the location information of the moving object and the location information of the reference end point, location information of end points of at least two of the multiple candidate trajectories being different from the location information of the reference end point; and a target trajectory determination module, configured to determine the target trajectory of the moving object from the candidate trajectory set.

Correspondingly, the embodiments of the disclosure provide a non-transitory computer storage medium having stored thereon computer-executable instructions that, when executed, implement following: determining location information of a reference end point of a moving object according to location information of the moving object; determining a candidate trajectory set including multiple candidate trajectories according to the location information of the moving object and the location information of the reference end point, wherein location information of end points of at least two of the multiple candidate trajectories is different from the location information of the reference end point; and a target trajectory of the moving object is determined from the candidate trajectory set.

The embodiments of the disclosure provide an electronic device, which may include a memory having stored thereon computer-executable instructions, and a processor. The computer-executable instructions in the memory, when executed by the processor, cause the processor to implement following: determining location information of a reference end point of a moving object according to location information of the moving object; determining a candidate trajectory set including multiple candidate trajectories according to the location information of the moving object and the location information of the reference end point, wherein location information of end points of at least two of the multiple candidate trajectories is different from the location information of the reference end point; and a target trajectory of the moving object is determined from the candidate trajectory set.

The embodiments of the disclosure provide a computer program including computer-readable code that, when running in an electronic device, causes a processor in the electronic device to implement any above method for trajectory prediction.

BRIEF DESCRIPTION OF THE DRAWINGS

The accompanying drawings, which are incorporated in and constitute a part of this specification, illustrate embodiments consistent with the disclosure and, together with the specification, serve to illustrate the technical solutions of the disclosure.

DETAILED DESCRIPTION

In order to make the purpose, technical solutions and advantages of the embodiments of the disclosure clearer, the specific technical solutions of the disclosure will be described below in more detail in combination with the accompanying drawings in the embodiments of the disclosure. The following embodiments are used for illustrating the disclosure, but not for limiting the scope of the disclosure.

An embodiment presents a method for trajectory prediction, which is applied to a computer device. The computer device may include a moving object or a non-moving object. The function achieved by the method may be achieved by calling a program code by a processor in the computer device. Of course, the program code may be stored in a computer storage medium. Hence the computer device includes at least a processor and a storage medium.

The embodiments of the disclosure provide a method and apparatus for trajectory prediction, a device and a storage medium. First, a reference end point of a moving object is predicted according to location information of a present location of the moving object; then, a candidate trajectory set composed of multiple candidate trajectories of the moving object is determined according to the reference end point and a historical trajectory; finally, a target trajectory of the moving object is determined from the candidate trajectory set. In this way, by considering the location information of the moving object in predicting the reference end point of the moving object, multiple candidate trajectories that the moving object may travel are inferred, and an optimal trajectory is selected from the multiple candidate trajectories as the target trajectory of the moving object, so as to more accurately estimate the future motion trajectory of the moving object.

Figure 1A:
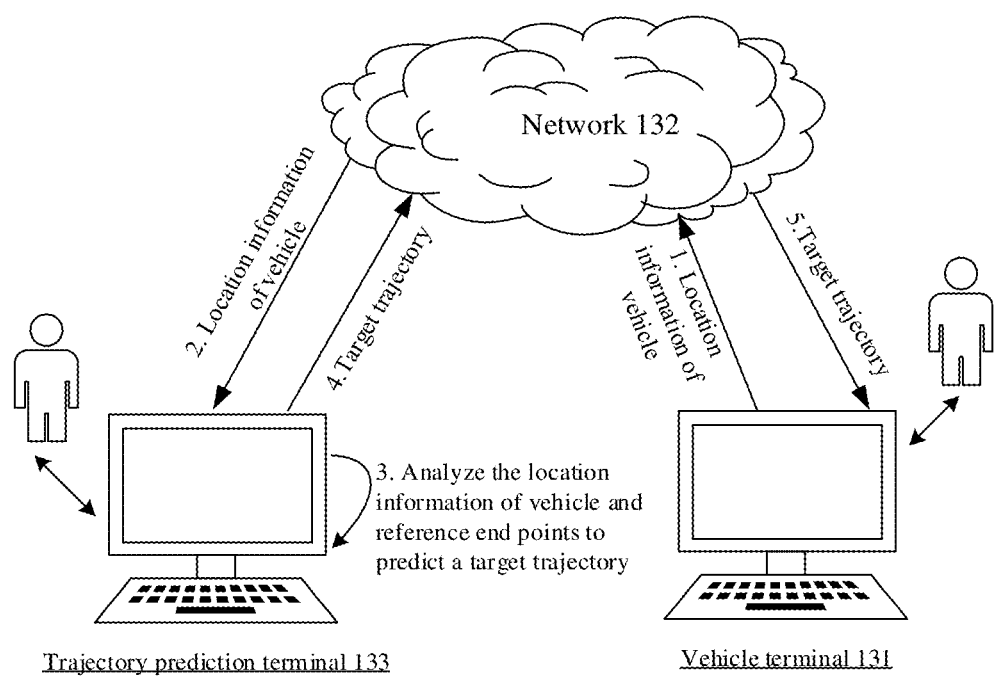
FIG. 1A illustrates a schematic diagram of a system architecture to which a method for trajectory prediction according to embodiments of the disclosure may be applied.

FIG. 1A illustrates a schematic diagram of a system architecture to which a method for trajectory prediction of the embodiment of the disclosure may be applied. As illustrated in FIG. 1A, the system architecture may include: a vehicle terminal 131, a network 132 and a trajectory prediction terminal 133. To support an exemplary application, a communication connection may be established between the vehicle terminal 131 and the trajectory prediction terminal 133 through the network 132. The vehicle terminal 131 reports location information to the trajectory prediction terminal 133 through the network 202 (or the trajectory prediction terminal 133 automatically acquires location information of the vehicle terminal 131). In response to the received location information, the trajectory prediction terminal 133 determines location information of a reference end point of the vehicle, and then predicts multiple candidate trajectories through the location information of the vehicle and the location information of the reference end point. Finally, the trajectory prediction terminal 133 selects a target trajectory of the vehicle from the multiple candidate trajectories.

As an example, the vehicle terminal 131 may include an on-board image acquisition device, and the trajectory prediction terminal 133 may include an on-board visual processing device or remote server with a visual information processing ability. The network 132 may be connected in a wired or wireless manner. When the trajectory prediction terminal 133 is an on-board visual processing device, the vehicle terminal 131 may communicate with the on-board visual processing device through a wired connection, for example, performs data communication through a bus. When the trajectory prediction terminal is a remote server, the vehicle terminal may perform data interaction with the remote server through a wireless network.

Alternatively, in some scenarios, the vehicle terminal 131 may be an on-board visual processing device with an on-board image acquisition module, and is specifically embodied as an on-board host with a camera. In this case, the method for trajectory prediction according to the embodiments of the disclosure may be performed by the vehicle terminal 131, and the system architecture mentioned above may not include the network and the trajectory prediction terminal.

Figure 1B:
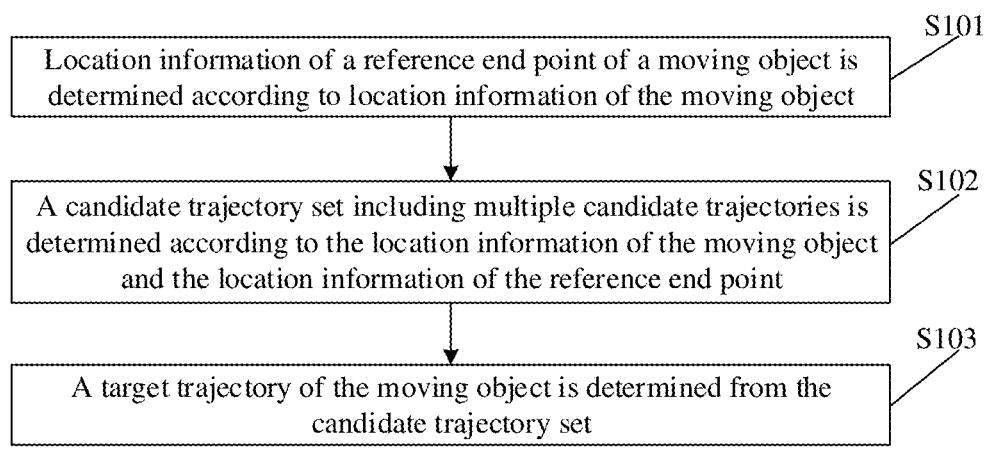
FIG. 1B illustrates a schematic implementation flowchart of a method for trajectory prediction according to embodiments of the disclosure.

FIG. 1B illustrates a schematic implementation flowchart of a method for trajectory prediction according to embodiments of the disclosure. Explanation is made in combination with the method in FIG. 1B.

At S101, location information of a reference end point of a moving object is determined according to location information of the moving object.

In some possible implementations, the moving object includes: vehicles with various functions, vehicles with various numbers of wheels, robots, aircrafts, blind guide devices, intelligent furniture or intelligent toys, etc. Explanation is made below with a vehicle as an example. The reference end point includes a point other than preset limit types. The preset limit types include at least one of: road edge points, obstacles, and pedestrians. That is, the reference end point does not include the points on the road edge, the points on the road where an obstacle exists, and the points on the road where a pedestrian exists. In this way, by taking road edge points, obstacles and pedestrians as the limit types, the rationality of a finally predicted target trajectory can be improved.

The location information of the moving object includes: time sequence location information of the moving object, or a historical trajectory of the moving object. In this way, the candidate trajectories of the moving object can be predicted through the historical trajectory and the time sequence location information of the moving object.

The reference end point may be determined in many following manners. For example, first of all, without using a coded road image as a network input, the reference end point is predicted through the location information of the moving object, or the reference end point is predicted using the coded road image as the network input in combination with the location information of the moving object. Then, the predicted reference end point is constrained; For example, a specific area is set, and only the point within the specific area is determined as the reference end point. The method of determining the reference end point in S101 may be any method, as long as it is based on the location information of the moving object.

For example, the method for determining an end point based on location information and a machine learning model such as feature learning or reinforcement learning may be used. The neural network may at least have the location information of the moving object as input and output the end point or a trajectory containing the end point. In this method, the end point may be determined by using the location information and surrounding environment information of the moving object as the input of the neural network. In this way, the location information of the reference end point of the moving object can be predicted accurately through the surrounding environment information of the moving object and the location information of the moving object.

Alternatively, the location information of the moving object may be used as the input of the neural network, and the end point may be determined by using the output of the neural network and the surrounding environment information of the moving object. In addition, the location information and surrounding environment information of the moving object may be used as the input of the neural network, and the reference end point may be determined by using the output of the neural network and the surrounding environment information of the moving object. For example, a trajectory of the moving object may be determined as the output of the neural network, and the determined candidate trajectory may be adjusted based on the surrounding environment information of the moving object, so that the candidate trajectory overlaps with no pedestrian or sidewalk; and a reference end point contained in the optimized candidate trajectory is determined.

As another method for determining the reference end point, a method using the location information and a kinematic model of a moving object may be used. In this method, the reference end point may be determined by using the location information, the kinematic model of the moving object and surrounding environment information of the moving object.

In a specific example, S101 may also be implemented in the following two manners. The first manner is that: first of all, the location information (e.g. a historical trajectory) of a vehicle is sampled to obtain a sampled point set; then, a preset neural network is used to extract features from the sampled point set; finally, the extracted features are input into a fully connected layer of the preset neural network to obtain the reference end point. The second manner is that: by sampling the location information of the vehicle and in combination with a present travel speed of the vehicle, the reference end point of the vehicle in a preset period of time may be predicted. In another specific example, the location information may be a moving trajectory of a vehicle in a preset period of time with a present time as the end of time, for example, the moving trajectory within 3 seconds with the present time as the end of time; then, the historical trajectory within the 3 seconds is sampled with a step length of 0.3 second; finally, the reference end point of the moving object is predicted by taking the obtained sampled point as priori information.

At S102, a candidate trajectory set including multiple candidate trajectories is determined according to the location information of the moving object and the location information of the reference end point.

In some possible implementations, location information of end points of at least two of the multiple candidate trajectories is different from the location information of the reference end point. That is, the candidate trajectory set includes some candidate trajectories (for example, one candidate trajectory) of which the location information of end point is the same that of the reference end point, and some candidate trajectories of which the location information of end point is different from that of the reference end point. In this way, by determining multiple candidate trajectories within a tolerance range, not only the multiple determined candidate trajectories are reasonable, but also the diversity of the candidate trajectories is enriched, so that the target trajectory can be screened out from the rich candidate trajectories, and the accuracy of the predicted target trajectory is improved. S102 may be achieved by the following process. First, M estimated end points are determined within a preset area containing the reference end point. The M estimated end points include the reference end point. Then, M×N candidate trajectories are correspondingly generated according to the historical moving trajectory, the M estimated end points and N preset distances to obtain the candidate trajectory set. Each of the N preset distances is used for indicating a distance from a midpoint of a connection line between a last sampled point in the historical moving trajectory and the end point to the candidate trajectory. Both M and N are integers greater than 0. The candidate trajectory set is a curve set including multiple candidate trajectories. Trajectory parameters of the candidate trajectory include: the coordinates of the estimated end point and the distance from the midpoint of the candidate trajectory to the connection line between the last sampled point of the historical trajectory and the estimated end point. Trajectory parameter correction values are correction values for the coordinates of the estimated end point and the distance. The curve shape of the candidate trajectory is adjusted based on the correction value to make the adjusted candidate trajectory more reasonable.

At S103, a target trajectory of the moving object is determined from the candidate trajectory set.

In some possible implementations, the target trajectory is selected from multiple candidate trajectories according to the confidence of each candidate trajectory and travel information, so that the moving object travels according to the target trajectory.

In this way, the optimal trajectory is selected from multiple candidate trajectories as the target trajectory of the moving object, so as to more accurately estimate the future motion trajectory of the moving object.

In the embodiments of the disclosure, the problem in the related art that it is difficult to reflect the future travel trend of a vehicle by outputting discrete coordinate points of the vehicle corresponding to a future time sequence and using the discrete coordinate points to represent the future trajectory of the vehicle, which has little effect in practical applications can be solved effectively. By predicting the reference end point of the moving object, inferring multiple candidate trajectories that the moving object may travel, and selecting an optimal trajectory from the multiple candidate trajectories as the target trajectory that the moving object travels on, the future motion trajectory of the moving object is estimated more accurately.

In some embodiments, the location information of the reference end point of the moving object is predicted through the surrounding environment information of the moving object in combination with the location information of the moving object, which may be implemented by the following operations.

First, environment information of the moving object is obtained according to the location information of the moving object.

For example, according to the historical trajectory of the moving object, the surrounding environment information of the historical trajectory is obtained. For example, road information, obstacle information, pedestrian information, traffic light information, traffic sign information, traffic rule information or information about other moving objects around the historical trajectory are obtained. The road information at least includes: the present road conditions (e.g., congestion), a road width, road junction information of the road (e.g., whether it is a road junction), etc. The obstacle information includes: whether there is a roadblock or other obstacles on the present road. The pedestrian information includes whether there is a pedestrian on the road and the location of the pedestrian. The traffic light information at least includes: the number of traffic lights arranged on the road and whether the traffic lights are working properly. The traffic sign information includes: the type and duration of the traffic light that is lighted up at present. The traffic rule information includes whether it is regulated to keep to the right or left on the present road, whether the present road is one-way or two-way, and the types of vehicles that are allowed to travel on the road. In some possible implementations, the operation of obtaining the environment information of the moving object according to the location information of the moving object may be implemented in the following two manners.

First manner, the environment information is determined according to image information acquired by the moving object.

For example, first of all, images around the historical trajectory of the moving object are acquired by a camera provided on the moving object (for example, image acquisition is performed for the environment around the moving object) to obtain the image information, and the surrounding environment information of the moving object is obtained by analyzing content of the images. For example, after image acquisition of the moving object, the road information, the obstacle information, the pedestrian information, the traffic light information, etc. about the moving object are obtained; and by comprehensively analyzing the information, the location information of possible reference end points of the moving object is predicted, and the points contained in the preset limit types are excluded from the possible reference end points, so as to obtain the reference end point of the moving object.

Second manner, the environment information is determined according to communication information received by the moving object. The communication information represents a present environment. In this way, by analyzing the communication information and the image information of the moving object, the points belonging to the preset limit types can be excluded from the reference end points, so as to obtain the reference end point of the moving object.

For example, the moving object uses a communication device to receive communication information representing the present environment from other devices, and obtains the environment information by analyzing the communication information. The communication information includes at least environment parameters of the location of the moving object, such as the road information, the obstacle information, the pedestrian information, the traffic light information, the traffic sign information, the traffic rule information or the information about other moving objects.

Then, the location information of the reference end point of the moving object is determined according to the environment information.

In some embodiments, when the moving object is at a road junction, the location information of the reference end point of the moving object may be determined by the following operations.

At the first operation, road junction information of a road where the moving object is located is determined according to the location information of the moving object.

For example, according to the historical trajectory of the moving object, the road junction information of the road ahead of the moving object as it continues travels along the historical trajectory is determined. The road junction information includes: the number of road junctions, the crossing situation of the road junctions, etc.

At the second step, in response to the road junction information indicating that at least two road junctions exist, location information of multiple reference end points of the moving object is determined.

In this way, the missed reference end points can be reduced, thus improving the accuracy of the determined target trajectory.

Here, when there are multiple road junctions on the road where the moving object is located, the reference end point on the road corresponding to each road junction are determined. That is, the location information of the possible reference end point is predicted on the road corresponding to each road junction, and each road junction corresponds to a respective different reference end point. For example, the road junction of the road where the moving object is located is a crossing. First, three road junctions in the crossing except the opposite direction of the travel direction of the moving object are determined, and then the location information of the reference end points on the roads corresponding to the three road junctions is predicted respectively. In this way, multiple reference end points are predicted, and then a target end point with the maximum confidence is selected from the multiple reference end points. The missed reference end points are reduced, thus improving the accuracy of the determined target trajectory.

In some embodiments, in order to improve the accuracy of the predicted reference end point, S101 may be implemented by the following operations.

At the first step, at least one reference route of the moving object is determined according to the location information of the moving object.

Here, the present road conditions and whether the moving object is at a road junction contained in the location information of the moving object are input into the neural network to predict multiple reference routes. For example, if the location information indicates that the moving object is on a straight one-way road, then there is one reference route, which is a route on the one-way road along the moving direction of the moving object. If the location information indicates that the moving object is at a T-road junction, then there are three reference routes, which are respectively the route on each road in the T-road junction along the moving direction of the moving object. If the location information indicates that the moving object is at a crossing, then there are four reference routes, which are respectively the route on each road in the crossing along the moving direction of the moving object. In this way, in combination with the location information of the moving object, multiple reference routes that the moving object may travel are predicted by comprehensive consideration.

At the second step, the location information of the reference end point is determined according to the at least one reference route.

In some possible implementations, a route on which the moving object is most likely to travel in the future is determined from the multiple reference routes, and the location information of the reference end point of the moving object is determined on this reference route. In this way, the accuracy of the predicted reference end point can be improved.

In some embodiments, a freespace of each of the at least one reference route is determined first.

For example, roadblock information and road edges of a reference route are determined. Here, obstacles on each reference route, such as a pedestrian, a broken vehicle, or a roadblock, are determined.

Then, the freespace of the reference route is determined according to the roadblock information and road edges of the reference route.

In this way, the effectiveness of the freespace on each reference route is improved.

Here, by considering the roadblock information and road edge on each reference route, the freespace on the reference route is designated. For example, an area within the road edge of the reference route and without roadblock is taken as the freespace. Thus, the effectiveness of the freespace on each reference route is improved.

Then, the location information of the reference end point of the moving object in the freespace is determined according to the location information of the moving object. Here, the reference end point of the moving object in the freespace of the reference route may be predicted according to the historical trajectory of the moving object. For example, under the condition that the freespace of the reference route has been determined, the reference end point in the freespace of the reference route is predicted according to the historical trajectory of the moving object.

The above provides a manner for predicting the end point of a moving trajectory. In this manner, after predicting the end point of trajectory, the network generates candidate trajectories according to the end point obtained in the first step, and the end point corresponding to each candidate trajectory. Moreover, the end point of the candidate trajectory cannot be beyond the road or in a place with obstacles (such as a pedestrian), thus improving the effectiveness of the predicted reference end point.

Finally, the candidate trajectory set on each reference route is determined according to the reference end point on the reference route and the location information of the moving object.

Here, for each reference route, by predicting multiple grids where end points may exist near the reference end point, and combining with the last sampled point in the historical trajectory and multiple specific preset distances, multiple possible pre-estimated points on the moving trajectory are determined. The candidate trajectory set on the reference route is obtained by connecting the pre-estimated points and multiple possible end points. In this way, the candidate trajectory set on each reference route is obtained, and the target trajectory of the moving object is determined from the candidate trajectory set on at least one reference route.

In this way, through multiple iterations, a candidate trajectory that finally meets the constraint is determined from the candidate trajectory sets on multiple reference routes as the most likely travel trajectory of the moving object, that is, the target travel trajectory.

Figure 1C:
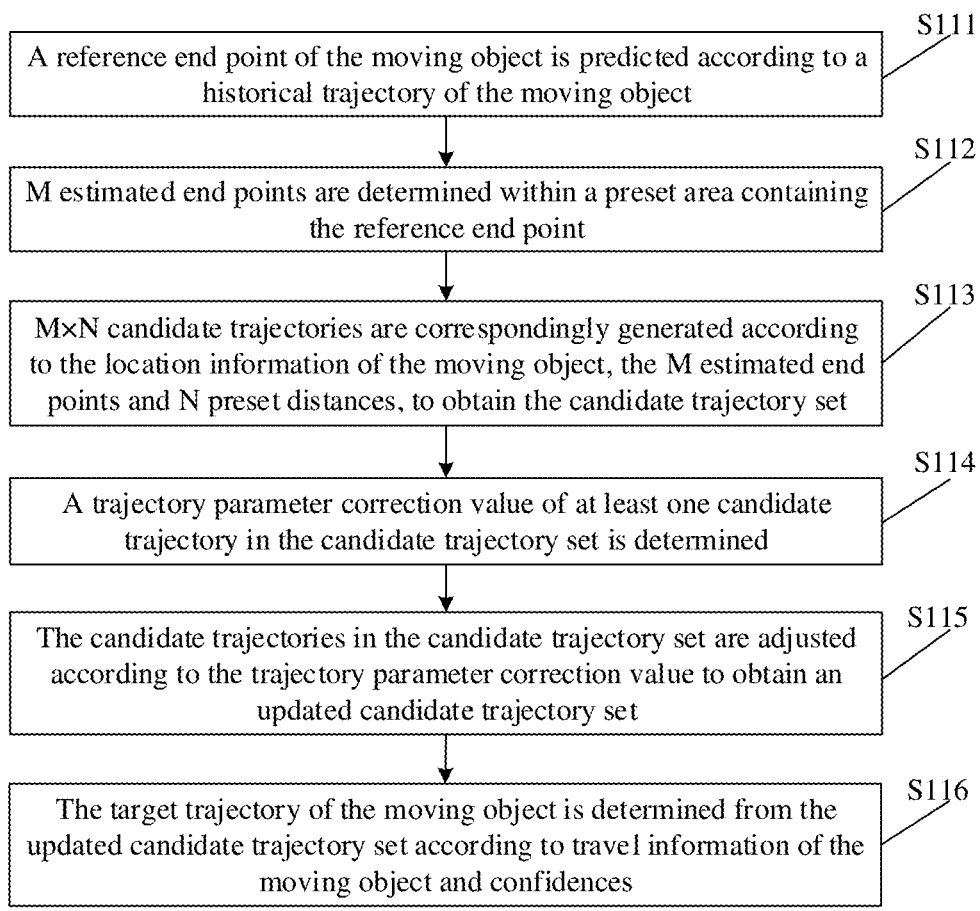
FIG. 1C illustrates a schematic implementation flowchart of a method for trajectory prediction according to embodiments of the disclosure.

The embodiments of the disclosure provide a method for trajectory prediction, which is applied to a moving object. Explanation is made with an example of being applied to a vehicle. FIG. 1C illustrates a schematic implementation flowchart of a method for trajectory prediction according to embodiments of the disclosure. As illustrated in FIG. 1C, an explanation is made in combination with the method in FIG. 1C.

At S111, a reference end point of a moving object is predicted according to a historical trajectory of the moving object.

At S112, M estimated end points are determined within a preset area containing the reference end point.

In some possible implementations, for each reference route, M estimated end points are determined within the preset area containing the reference end point of the reference route. The preset area is the area surrounding the reference end point, for example, a square with a side length of 100 m centered on the reference end point, and then the square is divided into multiple square grids according to a step length of 5 m. The center of each grid is an estimated end point. First, the preset area containing the reference end point is determined according to the width of the road where the reference end point is located, for example, the area containing the reference end point on the road within the road edge of the reference route is taken as the preset area. In a specific example, the road width is 4 m, and the area containing the reference end point with a width of 4 m and a length of 100 m is taken as the preset area; then, the preset area containing the reference end point is divided into M grids with a predetermined size, and the centers of the M grids are taken as the M estimated end points. For example, the grids with the same size are used, and the size of the grids is set to 10 cm. In this way, by taking the centers of M grids as the M estimated end points, namely the possible end points of candidate trajectories, the possible end points of the candidate trajectories on each reference route are obtained.

In this way, by taking the centers of the M grids as the M estimated end points, the accuracy of predicting possible end points of the candidate trajectories can be improved.

At S113, M×N candidate trajectories are correspondingly generated according to the location information of the moving object, the M estimated end points and N preset distances to obtain the candidate trajectory set.

In some possible implementations, each of the N preset distances is used for indicating a distance from a midpoint of a connection line between a last sampled point in the location information of the moving object and a reference end point to a respective candidate trajectory, and both M and N are integers greater than 0. In a specific example, first, the midpoint of the connection line between the last sampled point in the location information of the moving object and the reference end point is determined. Second, N pre-estimated points are determined according to the N preset distances and the midpoint. A pre-estimated point is a point on a candidate trajectory. Since the preset distance is the distance from the midpoint of the connection line between the last sampled point in the location information (for example, the historical trajectory) of the moving object and the reference end point to a candidate trajectory, then after the midpoint and the preset distance are determined, the pre-estimated point that takes the midpoint as the foot of a perpendicular and has a distance from the midpoint meeting the preset distance can be determined. Thus, N preset distances correspond to N pre-estimated points. Third, M×N candidate trajectories are generated according to the N pre-estimated points and each of M estimated end points; that is, N candidate trajectories can be obtained by fitting based on the N pre-estimated points and one estimated end point. Then M×N candidate trajectories can be obtained by fitting based on N pre-estimated points and M estimated end points. Finally, the M×N candidate trajectories are screened according to the environment information to obtain the candidate trajectory set. The environment information may be obtained from images. For example, if an obstacle is detected in the images, the candidate trajectories cannot pass through the obstacle. The road information may also be obtained from the images and used in setting the candidate trajectories. In generating the candidate trajectories, a constraint is set by considering the surrounding environment information, to remove trajectories that do not meet the constraint from the M×N candidate trajectories to obtain the candidate trajectories set. For example, the candidate trajectories passing through the obstacle are removed.

In this way, by setting a constraint, the trajectories that do not meet the constraint in the M×N candidate trajectories are removed, so as to obtain a more accurate candidate trajectory set.

S112 and S113 provide a manner for implementing "determining a candidate trajectory set composed of multiple candidate trajectories of the moving object". In this manner, multiple estimated end points that may be the end points of candidate trajectories are determined around the reference end point, and then multiple candidate trajectories are obtained by fitting based on the estimated end points and preset distances. In this way, by predicting the target trajectory of the vehicle by using curve representation, not only the trend of the trajectory can be reflected, there is also robustness to noise and strong scalability.

At S114, a trajectory parameter correction value of at least one candidate trajectory in the candidate trajectory set is determined.

In some possible implementations, at S114, the trajectory parameter correction value of each candidate trajectory may be output based on a trained neural network, and the trajectory parameter correction value may also be output by using a neural network trained by, but not limited to, a training method mentioned below. The trajectory parameter may include parameters used for describing trajectory curves. For example, the trajectory parameter may include, but is not limited to, the coordinates for describing the end points of the trajectory curve, and/or the distance from the midpoint of the trajectory curve to the connection line between two end points of the trajectory curve, etc. The candidate trajectory is adjusted according to the correction value, to improve the rationality of the obtained target trajectory. For example, the correction value may include, but is not limited to, adjustment values for the coordinates of the end points of the trajectory curve, and/or an adjustment value for the distance from the midpoint of the trajectory curve to the connection line between two end points of the trajectory curve. The trajectory parameter correction value may be determined by the neural network trained by the embodiments of the disclosure or by the neural network trained in other ways.

At S115, the at least one candidate trajectory in the candidate trajectory set is adjusted according to the trajectory parameter correction value to obtain an updated candidate trajectory set.

In some possible implementations, each candidate trajectory in the candidate trajectory set is corrected based on the adjustment values for the coordinates of the end points of the trajectory curve and the adjustment value for the distance from the midpoint of the trajectory curve to the connection line between two end points of the trajectory curve, to obtain multiple corrected candidate trajectories, that is, the updated candidate trajectory set. In this way, by correcting the candidate trajectories based on correction values output by the trained neural network, the accuracy of the candidate trajectories in the updated candidate trajectory set is improved.

At S116, a target trajectory of the moving object is determined from the candidate trajectory set according to travel information of the moving object and confidences.

In this way, the candidate trajectories are adjusted according to the trajectory parameter correction value to improve the rationality of the obtained target trajectory.

In some possible implementations, the target trajectory is screened out from the updated candidate trajectory set. The travel information of the moving object includes at least road information of the moving object and/or control information of the moving object. In this way, the purpose of screening the candidate trajectories can be achieved.

Figure 3A:
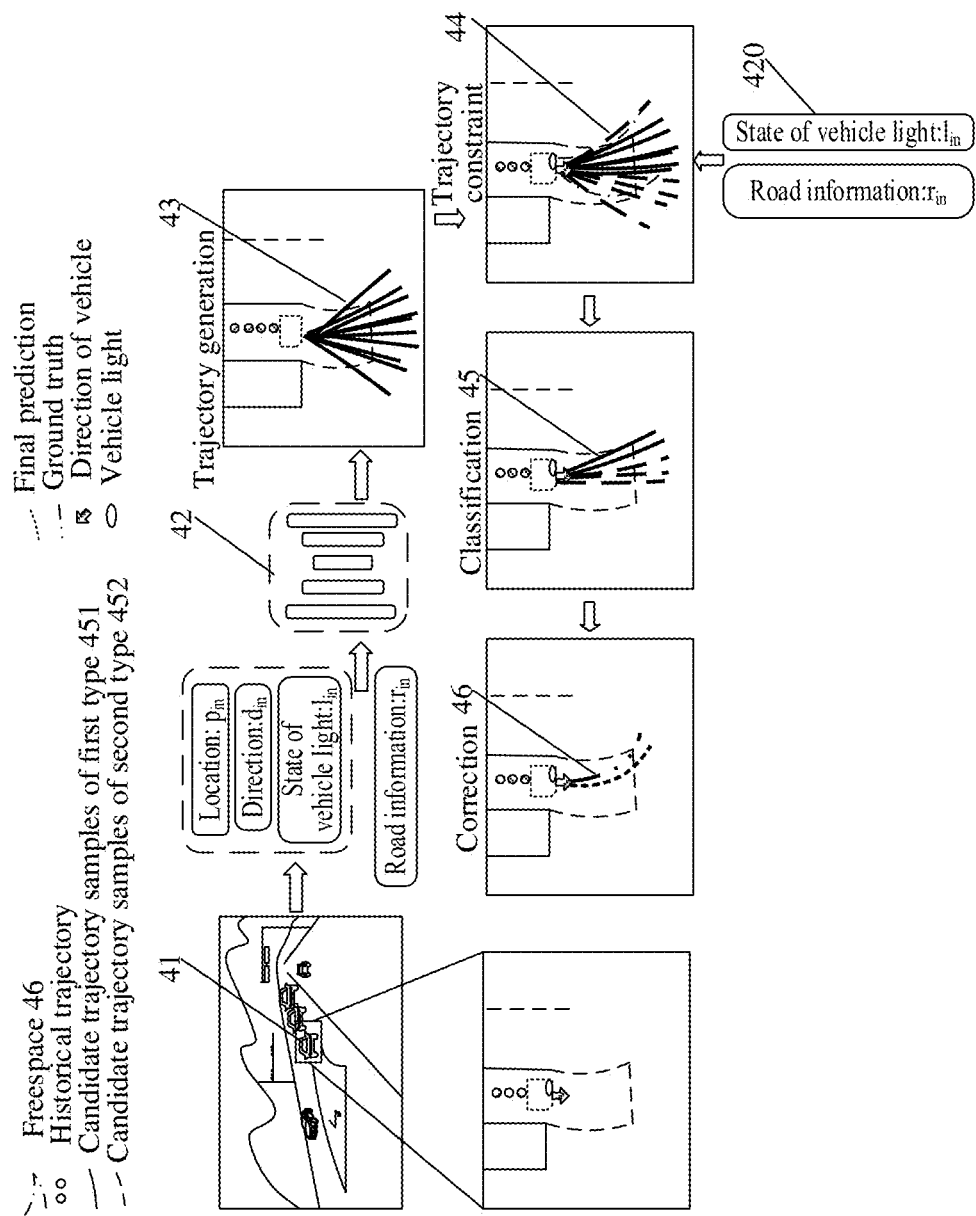
FIG. 3A illustrates a schematic structural diagram of implementation of a candidate trajectory network according to embodiments of the disclosure.

For example, the road information includes: the road width, the road edge, a center line on the road, etc. The control information of the moving object includes: the travel direction, the travel speed, and the states of vehicle lights (for example, the state of the turn light), etc. Here, first of all, a predicted freespace of the moving object is determined according to the road information. The freespace of the vehicle is as illustrated in FIG. 3A, the freespace 46 of the vehicle. The road information includes at least: whether the road is in the same direction, the road width, the road junction on the road, etc. For example, if the road information indicates that this road section is in the same direction and is not a road junction, then the maximum predicted freespace is the area covering the whole road in front of the vehicle, that is, the area is one-way. If the road information indicates that this road section contains a crossing, then the maximum predicted freespace is the area covering the whole roads around the vehicle, that is, the area includes three directions (turn left, go straight and turn right) of the crossing. In this way, the predicted freespace is narrowed through the control information of the moving object to obtain a more accurate freespace.

Second, candidate trajectories to be adjusted in the updated candidate trajectory set which are not contained in the predicted freespace are determined. For example, the candidate trajectories in the candidate trajectory set which are not contained in the freespace 46 are determined.

Third, the confidences of the candidate trajectories to be adjusted are reduced to obtain an adjusted candidate trajectory set. At the same time, the confidences of the candidate trajectories contained in the freespace should be increased, so as to more clearly indicate which candidate trajectories are closest to the final target trajectory.

Finally, the predicted freespace is adjusted according to the control information of the moving object to obtain the freespace. The predicted freespace is narrowed according to the control information of the moving object to obtain a more accurate freespace. For example, if the road information indicates that this road section is a crossing, and the predicted freespace includes three directions (turn left, go straight and turn right) of the crossing, but the control information indicates that the vehicle is to turn left, then the coverage area of the predicted freespace may be narrowed from covering three directions (turn left, go straight and turn right) to covering only the direction of turning left. In this way, the coverage area of the freespace is further accurate, so as to determine the final target trajectory of the vehicle more accurately.

At the second step, the target trajectory of the moving object is determined from the updated candidate trajectory set according to the freespace and the confidences.

First, the candidate trajectories in the updated candidate trajectory set which are contained in the freespace are determined to obtain a target trajectory set to be determined; then, the trajectory with a confidence is greater than a preset confidence threshold in the target trajectory set to be determined is determined as the target trajectory. For example, the candidate trajectory with the maximum confidence in the target trajectory set to be determined is taken as the target trajectory, thus fully improving the accuracy of the predicted target trajectory of the vehicle. In this way, the candidate trajectory set is predicted first based on the historical trajectory, and then the freespace that the candidate trajectories should belong to is further narrowed according to the control information and the road information, so as to achieve the purpose of screening the candidate trajectories.

In some embodiments, S116 may be implemented by the following operations.

At S161, confidences corresponding to the candidate trajectories in the candidate trajectory set are determined.

In some possible implementations, the confidence is used for indicating the probability that the candidate trajectory is the target trajectory. The confidence may be determined by the neural network trained by the embodiments of the disclosure or by the neural network trained in other ways.

At S162, the target trajectory of the moving object is determined from the candidate trajectory set according to the travel information of the moving object and the confidences.

In some possible implementations, one or the combination of the road information of the moving object and the control information of the moving object is used as priori information to correct the candidate trajectories, so as to make the final target trajectory more reasonable. The control information of the moving object may include, but is not limited to, at least one of the following: operating state of engine, steering information of steering wheel, or speed control information (such as deceleration, acceleration or braking).

S162 may be implemented by the following two steps.

At the first step, the freespace of the moving object is determined according to the environment information of the moving object and/or the control information of the moving object.

Here, the environment information of the moving object can be the road information. The freespace of the moving object is determined in the following manners. First manner, the freespace of the moving object is determined according to the road information of the road where the moving object is located. Second manner, the freespace of the moving object is determined according to the control information of the moving object. Third manner, the freespace of the moving object is determined according to the road information of the road where the moving object is located and/or the control information of the moving object. The road information refers to the information of the road where the vehicle is located at the present time, and the control information refers to the situation of the vehicle lights at the corresponding time of acquiring the historical trajectory of the vehicle. For example, if the vehicle light shows turn right at the time of acquiring the historical trajectory, then the control information is turn right, and it is determined that the freespace of the vehicle is a road area corresponding to turn right. The freespace may be understood as an area for the moving object to travel, for example, a road area that is obstacle-free and passable.

First, the predicted freespace of the moving object is determined according to the road information.

The freespace of the vehicle is illustrated in FIG. 3A, the freespace 46 of the vehicle. The road information may include, but is not limited to, at least one of the following: whether the road is in the same direction, the road width, the road junction on the road, etc. For example, if the road information indicates that this road section is in the same direction and is not a road junction, then the maximum predicted freespace is the area covering the whole road in front of the vehicle, that is, the area is one-way. If the road information indicates that this road section is a crossing, then the maximum predicted freespace is the area covering the whole roads around the vehicle, that is, the area includes three directions (turn left, go straight and turn right) of the crossing.

Second, the candidate trajectories to be adjusted in the updated candidate trajectory set which are not contained in the predicted freespace are determined. For example, the candidate trajectories in the candidate trajectory set which are not contained in the freespace 46 are determined.

Third, the confidences of the candidate trajectories to be adjusted are reduced to obtain the adjusted candidate trajectory set. At the same time, the confidences of the candidate trajectories contained in the freespace should be increased, so as to more clearly indicate which candidate trajectories are closest to the final target trajectory.

Finally, the predicted freespace is adjusted according to the control information of the moving object to obtain the freespace. For example, if the road information indicates that this road section is a crossing, and the predicted freespace includes three directions (turn left, go straight and turn right) of the crossing, but the control information indicates that the vehicle is turning left, then the coverage area of the predicted freespace may be narrowed from covering three directions (turn left, go straight and turn right) to covering only the direction of turning left. In this way, the coverage area of the freespace is further accurate, so as to determine the final target trajectory of the vehicle more accurately.

At the second step, the target trajectory of the moving object is determined from the updated candidate trajectory set according to the freespace and the confidences.

In some possible implementations, the candidate trajectories in the updated candidate trajectory set are screened to obtain the target trajectory. First, the candidate trajectories in the updated candidate trajectory set which are contained in the freespace are determined to obtain the target trajectory set to be determined; then, a trajectory with a confidence greater than a preset confidence threshold in the target trajectory set to be determined is determined as the target trajectory. For example, the candidate trajectory with the maximum confidence in the target trajectory set to be determined is taken as the target trajectory, thus fully improving the accuracy of the predicted target trajectory of the vehicle. In a specific example, taking the present time as the end of time, the moving trajectory of the vehicle in a preset period of time is obtained as the historical trajectory, for example, the moving trajectory within 3 seconds; then, the historical trajectory within the 3 seconds and the direction of the vehicle light within the 3 seconds are used as the priori information to predict the target moving trajectory of the vehicle in a future preset period of time, for example, the moving trajectory in the next 3 seconds is predicted. In this way, a future travel trajectory with high accuracy is provided for an autonomous vehicle.

In this way, the candidate trajectory with the maximum confidence in the target trajectory set to be determined is taken as the target trajectory, thus fully improving the accuracy of the predicted target trajectory of vehicle.

In the embodiments of the disclosure, by using the control information of the vehicle to narrow the freespace of the vehicle, and taking the candidate trajectory with the maximum confidence in the candidate trajectories contained in the freespace as the target trajectory of the vehicle, the prediction result is more reliable, and the safety of practical application is improved.

Figure 2A:
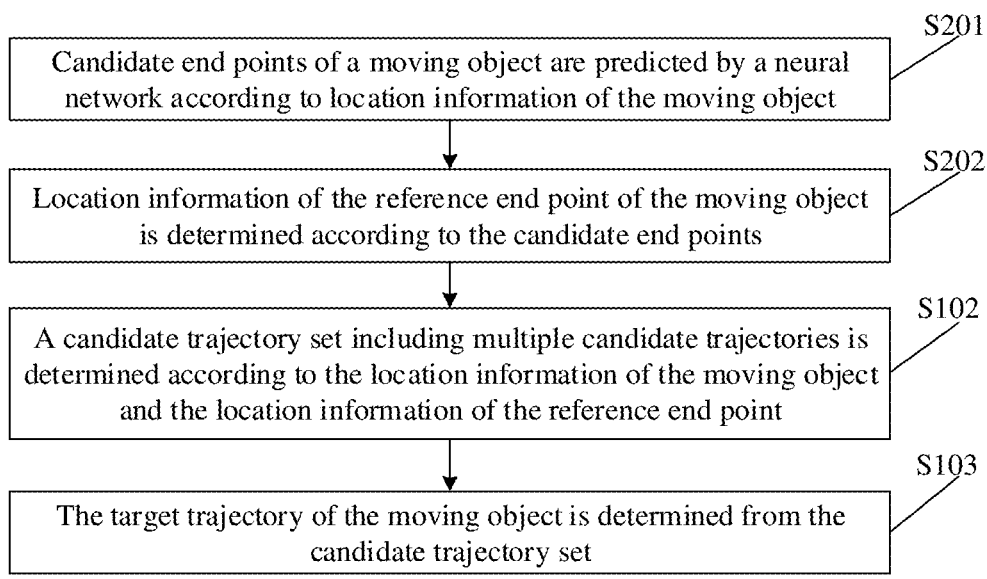
FIG. 2A illustrates another schematic implementation flowchart of a method for trajectory prediction according to embodiments of the disclosure.

The embodiments of the disclosure provide a method for trajectory prediction. In the method, at S101, a reference end point of a moving object may be predicted by using a trained neural network. FIG. 2A illustrates another schematic implementation flowchart of a method for trajectory prediction according to embodiments of the disclosure. Explanation is provided below in combination with FIG. 1.

At S201, a candidate end point of a moving object is predicted by a neural network according to location information of the moving object.

In some possible implementations, the neural network is a trained neural network that may be trained in the following manners.

First manner, at least one of the location information of the moving object, or the location information of the moving object and a road image acquired by the moving object are input into the neural network to obtain a first predicted end point.

For example, the location information of the moving object is taken as the input of the neural network to predict the first predicted end point; or, the location information of the moving object and the road image acquired by the moving object are taken as the input of the neural network to predict the first predicted end point.

Second, a first prediction loss of the neural network about the first predicted end point is determined according to a ground truth trajectory of the moving object.

In some possible implementations, the location information of the moving object, and/or the location information of the moving object and the road image acquired by the moving object are input into the neural network to obtain multiple candidate trajectories, and then a rough confidence of each candidate trajectory is estimated. Then, the accuracy of each trajectory in the candidate trajectory set is determined in combination with the ground truth trajectory, and the accuracy is fed back to the neural network, so that the neural network adjusts network parameters such as a weight parameter, to improve the accuracy in classification of the neural network. For example, 100 candidate trajectories are obtained. First, the neural network is used to perform convolution, deconvolution and other operations, so as to obtain the confidences of the 100 candidate trajectories. Since the parameters of the neural network are randomly initialized in a training stage, the roughly estimated confidences of the 100 candidate trajectories are also random. Therefore, to improve the accuracy of the candidate trajectories predicted by the neural network, it is needed to tell the neural network which of the 100 candidate trajectories are right and which are wrong. Based on this, a comparison function is used to compare the 100 candidate trajectories with the ground truth trajectory; if the similarity between a candidate trajectory and the ground truth trajectory is greater than a preset similarity threshold, 1 is output; otherwise, 0 is output; so the comparison function will output 100 comparison values, namely (0, 1) values. Next, the 100 comparison values are input into the neural network, so that the neural network uses a loss function to supervise the candidate trajectories, to increase the confidences of candidate trajectories with a comparison value of 1, and reducing the confidences of candidate trajectories with a comparison value of 0. In this way, the confidence of each candidate trajectory is obtained, that is, a classification result of the candidate trajectories is obtained. Finally, the trajectory prediction loss corresponding to the classification result is used to adjust the weight parameter of the neural network.

Finally, the network parameter of the neural network is adjusted according to the first prediction loss to train the neural network.

For example, the weight parameter is a neuron weight in the neural network. The first prediction loss is a cross entropy loss of candidate trajectory samples of a first type (e.g., positive samples) and candidate trajectory samples of a second type (e.g., negative samples). The weight and other parameters of the neural network are adjusted by using the prediction loss, so that the classification result of the adjusted neural network is more accurate.

In this way, the weight and other parameters of the neural network are adjusted by using the first prediction loss, so that a classification result of the adjusted neural network is more accurate.

Second manner, first, the location information of the moving object and map information corresponding to the location information are input into the neural network to obtain a second predicted end point.

In some embodiments, the map information includes at least the geographic location of the present road, the road width, the road edge, the roadblock information, etc.

Second, a second prediction loss of the neural network about the second predicted end point is determined according to the ground truth trajectory of the moving object.

For example, the ground truth trajectory is compared with the second predicted end point to determine the second prediction loss of the neural network about the second predicted end point.

Third, a deviation between the second predicted end point and a preset constraint is determined.

In some embodiments, the preset constraint includes the area where the predicted end point can exist on the road, for example, the area except for road edge points, obstacles and pedestrians on the road. For example, the deviation between the second predicted end point and the area where the predicted end point can exist is determined.

Third, the second prediction loss of the second predicted end point is adjusted according to the deviation to obtain a third prediction loss.

For example, when the deviation is relatively large, it indicates that the second predicted end point deviates significantly from the area where the predicted end point can exist, and the second prediction loss is appropriately increased to adjust the network parameters of the neural network.

Finally, the network parameter of the neural network is adjusted according to the third prediction loss to train the neural network.

In this way, the accuracy of the target trajectory output by the neural network is higher.

The above first manner and second manner are a training process of the neural network. Based on the location information of the moving object and the prediction loss, several iterations are performed to enable the trajectory prediction loss of the candidate trajectories output by the trained neural network to meet a condition of convergence, thus making the target trajectory output by the neural network more accurate.

At S202, the location information of the reference end point of the moving object is determined according to the candidate end point.

In some embodiments, the location information of the reference end point is determined according to the candidate end point output by the neural network, or the candidate end points output by the neural network is combined with the environment information to determine the location information of the reference end point.

In this way, using a trained neural network to predict the reference end point of the moving object can not only improve the accuracy of prediction, but also improve the prediction speed.

In some embodiments, S201 and S202 may be implemented in two manners.

First manner, first, the location information of the moving object is input into a first neural network to predict a first candidate end point of the moving object.

For example, the time sequence location information or the historical trajectory of the moving object is input into the first neural network to predict the first candidate end point of the moving object.

Then, the location information of the reference end point of the moving object is determined according to the first candidate end point and the environment information of the moving object.

For example, the first candidate end point is combined with the environment information of the moving object, such as the road information, the obstacle information, the pedestrian information, the traffic light information, the traffic sign information, the traffic rule information and the information about other moving objects, for comprehensive analysis, and the predicted first candidate end point that overlaps with pedestrians or sidewalks or is beyond the road edge is adjusted to obtain the location information of the reference end point with high accuracy.

In this way, the predicted first candidate end point that overlaps with a pedestrian or a sidewalk or exceeds the road edge is adjusted to obtain the location information of the reference end point with high accuracy.

Second manner, first, the location information and the environment information of the moving object are input into a second neural network to predict a second candidate end point of the moving object.

For example, the historical trajectory of the moving object, the road information, the obstacle information, the pedestrian information, the traffic light information, the traffic sign information, the traffic rule information and the information about other moving objects are taken as the input of the second neural network to predict the second candidate end point of the moving object.

Then, the location information of the reference end point of the moving object is determined according to the second candidate end point and the environment information.

In this way, a prediction result is more reliable, and the safety of practical application is improved.

For example, it is determined based on the environment information whether the predicted second candidate end point is in the freespace. In a specific example, it is determined whether the second candidate end point is located at the place where there are obstacles or pedestrians on the road. That is, the determined second candidate end point is adjusted based on the surrounding environment information of the moving object, so that the second candidate end point does not overlap with the pedestrians or sidewalks, and the travel end point contained in the adjusted trajectory is determined. In the embodiments of the disclosure, the neural network is trained by using the ground truth trajectory, the candidate trajectory set and the prediction loss, so that the trained neural network can output a target trajectory that is more close to ground truth trajectory. Thus the neural network can be better applied to predicting the future target trajectory of the moving object, and the accuracy of the predicted target trajectory is improved.

Figure 2B:
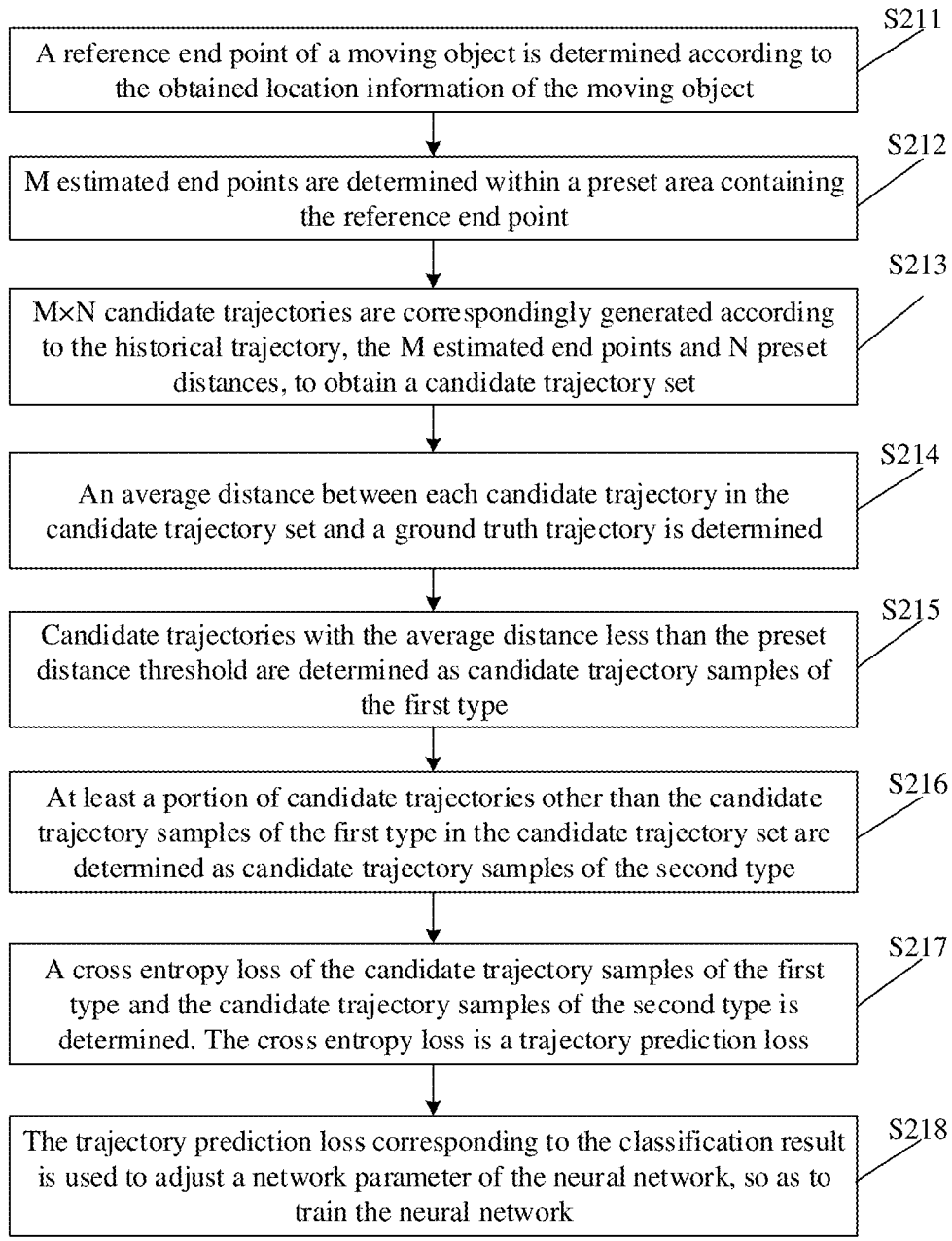
FIG. 2B illustrates a schematic implementation flowchart of a method for training a neural network according to embodiments of the disclosure.

The embodiments of the disclosure provide a method for training a neural network. FIG. 2B illustrates a schematic implementation flowchart of a method for training a neural network according to embodiments of the disclosure. Explanation is provided below in combination with FIG. 2B.

At S211, a reference end point of a moving object is determined according to acquired location information of the moving object.

For example, the reference end point of the moving object is determined according to a historical trajectory of the moving object.

At S212, M estimated end points are determined within a preset area containing the reference end point.

In some possible implementations, for each reference route, M estimated end points are determined within a preset area containing a reference end point of the reference route. First, the preset area containing the reference end point of each reference route is determined according to the width of the reference route; then, the preset area containing the reference end point of each reference route is divided into M grids with the same size, and the centers of the M grids are taken as the M estimated end points.

At S213, M×N candidate trajectories are correspondingly generated according to the historical trajectory, the M estimated end points and N preset distances to obtain a candidate trajectory set.

In some possible implementations, each of the N preset distances is used for indicating a distance from a midpoint of a connection line between a last sampled point in the historical trajectory and the reference end point to a respective candidate trajectory. M and N are both integers greater than 0. In a specific example, first, the midpoint of the connection line between the last sampled point in the historical trajectory and the reference end point is determined. Second, N pre-estimated points are determined according to the N preset distances and the midpoint. The pre-estimated point is a point on the candidate trajectory. Since the preset distance is the distance from the midpoint of the connection line between the last sampled point in the historical trajectory and the reference end point to a candidate trajectory, then after the midpoint and the preset distance are determined, the pre-estimated point that takes the midpoint as the foot of a perpendicular and has a distance from the midpoint meeting the preset distance can be determined. Thus, N preset distances correspond to N pre-estimated points. Third, M×N candidate trajectories are generated according to the N pre-estimated points and each of the M estimated end points. Finally, the M×N candidate trajectories are screened according to the environment information in the location information to obtain the candidate trajectory set. That is, N candidate trajectories can be obtained by fitting based on N pre-estimated points and one estimated end point, then M×N candidate trajectories can be obtained by fitting based on N pre-estimated points and M estimated end points.

At S214, an average distance between each candidate trajectory in the candidate trajectory set and the ground truth trajectory is determined.

In some possible implementations, the distances between each candidate trajectory and the ground truth trajectory are determined first, and then multiple distances obtained are averaged.

At S215, candidate trajectories with the average distance less than a preset distance threshold are determined as a candidate trajectory sample of a first type.

In some possible implementations, the candidate trajectory with the average distance less than the preset distance threshold indicates that the difference between the candidate trajectory and the ground truth trajectory is small. The candidate trajectory sample of the first type may also be understood as a candidate trajectory whose output value is 1 in a comparison function.

At S216, at least a portion of the candidate trajectories in the candidate trajectory set other than the candidate trajectory sample of the first type are determined as candidate trajectory samples of a second type.

In some possible implementations, a portion or all of the candidate trajectories in the candidate trajectory set other than the candidate trajectory samples of the first type are determined as the candidate trajectory samples of the second type. For example, the number of candidate trajectory samples of the second type is determined according to the ratio of the candidate trajectory samples of the second type to the candidate trajectory samples of the first type being 3:1. The candidate trajectory samples of the first type are closer to the ground truth trajectory than the candidate trajectory samples of the second type. From a certain perspective, it can also be understood that the candidate trajectory samples of the first type are more credible than the candidate trajectory samples of the second type. In this way, the ratio of the candidate trajectory sample of the second type to the candidate trajectory sample of the first type is set to 3:1, reducing the situation where the excessive number of the candidate trajectory samples of the second type plays a leading role in the trajectory prediction loss corresponding to the classification result and thus leads to an unsatisfactory result of training the neural network.

S214 to S216 provide a manner for implementing that the ground truth trajectory of the moving object is compared with candidate trajectories to determine the classification result of the candidate trajectories. In this manner, a process of classifying the candidate trajectories is completed by determining the candidate trajectory samples of the first type and the candidate trajectory samples of the second type. In some possible implementations, both the ground truth trajectory and the candidate trajectories are input into the comparison function. If the similarity between the candidate trajectory and the ground truth trajectory is greater than the preset similarity threshold, the comparison function outputs 1; otherwise, the comparison function outputs 0. In this way, the accuracy of classification is further improved.

At S217, a cross entropy loss of the candidate trajectory samples of the first type and the candidate trajectory samples of the second type is determined. The cross entropy is the trajectory prediction loss.

At S218, the trajectory prediction loss corresponding to the classification result is used to adjust the network parameter of the neural network, so as to train the neural network.

In the embodiments of the disclosure, a large number of trajectory data sets are used to train the neural network. Since the data sets include complex urban scenes, and data is acquired from the perspective of the autonomous vehicle and is closer to practical application, the neural network trained based on the data sets is suitable for trajectory prediction of various scenes, thus enabling the target trajectory predicted by the trained neural network more accurate.

In other embodiments, after S213, the method may further include the following operations.

At S231, the neural network is used to determine a trajectory parameter adjustment value of the candidate trajectories.

In some possible implementations, the adjustment value may be a prediction deviation between the candidate trajectory predicted by the neural network and the true value trajectory.

At S232, the deviation between the candidate trajectory and the ground truth trajectory is determined.

In some possible implementations, the deviation may be a true difference value between the coordinates of the end point of the ground truth trajectory and the coordinates of the end point of the candidate trajectory.

At S233, an adjusted prediction loss is determined according to the deviation and the adjustment value.

At S234, a weight parameter of the preset neural network is adjusted using the adjusted loss, so that the prediction loss output by the adjusted preset neural network meets the condition of convergence.

In some possible implementations, the adjusted loss is an Euclidean distance loss. Based on the Euclidean distance loss, the weight parameter of the neural network is adjusted to make the difference between the candidate trajectory and the ground truth trajectory smaller.

The embodiments of the disclosure provide a knowledge candidate trajectory network, and priori knowledge is integrated into vehicle trajectory prediction. First, a vehicle trajectory is modeled as a continuous curve parameterized by an end point and a distance parameter r. The vehicle trajectory model is robust to noise and provides a more flexible manner to integrate the priori knowledge into trajectory prediction. Then, the vehicle trajectory prediction is formulated as candidate trajectory generation and refinement tasks. Various observations are encoded into the network to generate basic features. A group of initial candidate trajectories are generated based on these features, candidate trajectory constraint is performed under the guidance of the priori information, such as the road information and the control information, and the final trajectory prediction is generated by providing two additional modules (a classification module which selects the optimal candidate trajectory, and a refinement module which performs trajectory regression and end point prediction). In this way, motion and intention can be reflected more naturally, the anti-noise performance is stronger. The priori information can be combined into a learning channel more flexibly.

At the same time, in order to evaluate the presented method and better promote the research on vehicle prediction in autonomous driving, the embodiments of the disclosure provide a large-scale vehicle trajectory data set and new evaluation criteria. The new data set includes millions of vehicle trajectories in complex urban driving scenarios, with richer information of each vehicle, such as the control information of the vehicle and/or road structure information for at least some of the vehicles.

In the embodiments of the disclosure, experiments with different durations are conducted, and a fitting error of the trajectory with a duration T is calculated. For example, duration T is set to 6 seconds. In the embodiments of the disclosure, a fitting trajectory obtained by performing cubic curve fitting on the predicted point is a candidate trajectory.

A cubic fitting curve with balance of accuracy and complexity is shown in formula 1:

$$y = ax^3 + bx^2 + cx + d \quad (1).$$

In formula (1), the total fitting error 0.29 meter (m) is negligible compared with the speed greater than 2 m/s. Because the curve is parameter-sensitive and is difficult to be optimized, the embodiments of the disclosure use two control points, namely the end point and the preset distance $\gamma$, and the sampled points on the historical trajectory to represent the curve.

FIG. 3A illustrates a schematic structural diagram of implementation of a candidate trajectory network according to embodiments of the disclosure. As illustrated in FIG. 3A, the location information $p_{in}$, the control information $l_{in}$, the direction information $d_{in}$ and the road information (for example, traffic restriction, road width, and usual traffic jam)

of the vehicle 41 are obtained. These pieces of information are detection results of an automatic driving system, and are all information in a historical period of the vehicle to be predicted, except for the road information. The road information is the map information at the present time around the vehicle to be predicted. The basic features 42 are generated through a basic feature coding module. Based on these basic features, future end points are predicted to obtain the reference end point. A group of cubic fitting curves 43 to serve as the candidate trajectories 43 are obtained by traversing the possible end points and γ; then, the road information and light states 420 of other vehicles on the road are taken as the constraint to constrain the generated candidate trajectories, so as to obtain the candidate trajectories 44 (namely the candidate trajectory set including multiple candidate trajectories). Next, the candidate trajectories 44 are classified to obtain the classification result 45. The candidate trajectory samples of the first type and the candidate trajectory samples of the second type are processed by a convolution layer to generate candidate trajectory features. After that, the classification module determines the freespace 46 of the vehicle according to a basic function and a candidate trajectory function. By creating a group of possible candidate trajectories, the embodiments of the disclosure selects, through the knowledge candidate trajectory network, reasonable trajectories that are easier to learn, for regression. Moreover, the priori knowledge may be more flexible and explicit, and the trajectories are more reliable.

Figure 3B:
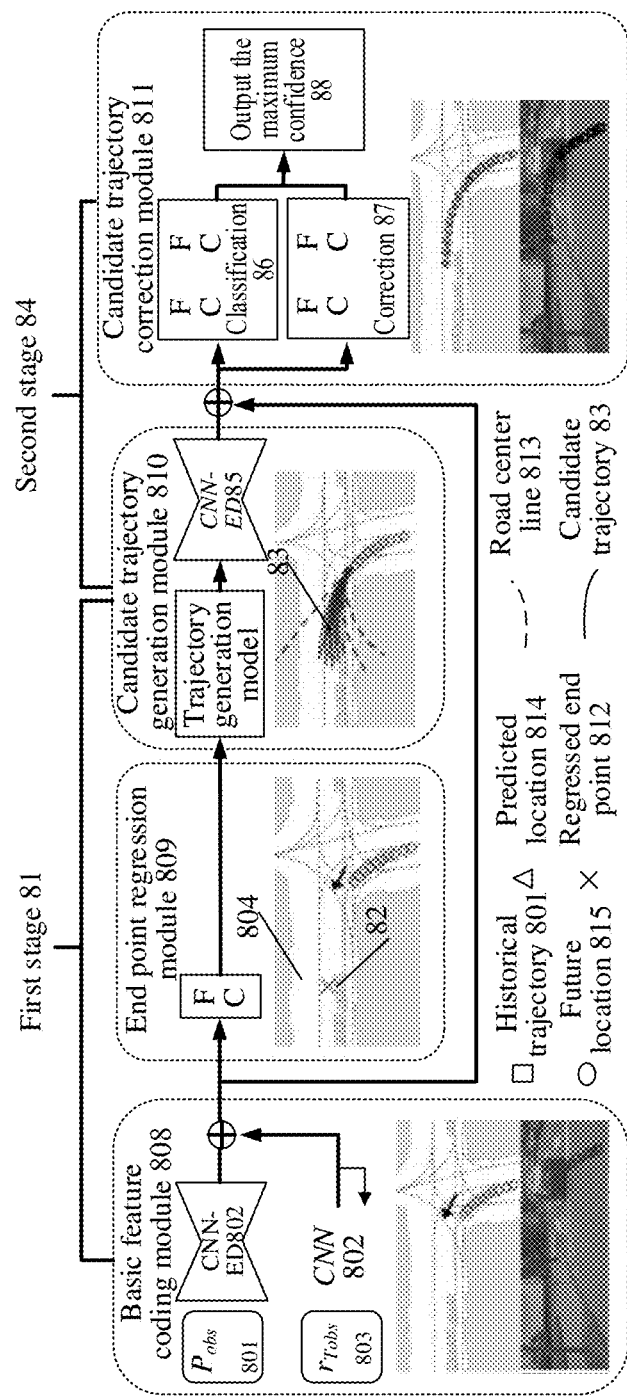
FIG. 3B illustrates a schematic structural diagram of implementation of a candidate trajectory network according to embodiments of the disclosure.

FIG. 3B illustrates a schematic structural diagram of implementation of a candidate trajectory network according to embodiments of the disclosure. As illustrated in FIG. 3B, the whole process is divided into two stages. In the first stage 81, in the basic feature coding module 808, the historical trajectory $P_{obs}$ 801 and the surrounding road information $r_{Tobs}$ 803 are input into a coding network 802 (Convolution Neural Network, CNN), and the roughly predicted end point 82 is output. It can be seen from FIG. 3B that, by inputting the surrounding road information combined with the center line 813 on the road, multiple reference routes are predicted when the vehicle is at a crossing, and for each reference route, the possible reference end point on each road at the crossing may be predicted. By considering the roadblock information or the pedestrian information in the road information and the road width, the output end point is constrained in an end point regression module 809 to obtain a regressed end point 812. In this way, the rough end point is regressed to reduce a search space, and then the candidate trajectories on each reference route are generated in a candidate trajectory generation module 810 (for example, the candidate trajectory set including multiple candidate trajectories is obtained), for example, the candidate trajectories 83 on the reference route 804 in FIG. 3B. In a candidate trajectory correction module 811 in the second stage 84, the candidate trajectories 83 are input into a classification network (Convolution Neural Network-Encoder and Decoder, CNN-ED) 85, for classification 86 and correction 87, to output the maximum confidence 88 and obtain predicted locations 814 of the vehicle. The final moving trajectory may be generated based on these predicted locations. In the process of correcting the candidate trajectories, the freespace is delimited based on the roadblock information and road width of the road, and the candidate trajectories outside the freespace are removed, that is, the candidate trajectories of dotted lines illustrated in FIG. 3B are candidate trajectories outside the freespace and will be removed. It can be seen from FIG. 3B that the actual future location 815, to which the vehicle will travel in the next few minutes, basically matches the predicted location 814, so the prediction method based on deep learning can be more explanatory and flexible by completing the process of generating the predicted trajectory in the first stage. Given the generated predicted trajectory, the second stage of the knowledge candidate trajectory network can simplify the prediction problem by selecting the most reasonable trajectory. In addition, by checking the output of the two stages, it is convenient to debug and interpret the possible false prediction.

In the embodiments of the disclosure, the basic feature coding module is designed as a coder-decoder network. The network takes (p, l, d, r) as input in a time interval [0, $T_{obs}$], where p represents the location, l represents the control information, d represents the direction of the vehicle, and r represents the local road information. The attributes of the vehicle (l, d) are obtained by a Deep Neural Networks (DNN) based model. For each time stamp t, $p_t=(x_t,y_t)$ is the coordinates of the vehicle, $l_t=(b_{lt},l_{tt},r_{tt})$ represent the brake light, the left turn light and the right turn light respectively, and are binary values respectively, and $d_t=(dx_t,dy_t)$ is a unit vector. The road information is represented by many semantic elements, such as lane line and cross walk, and is related to the location of the vehicle. In the embodiments of the disclosure, the road information is separated into a binary mask r=M as input, where $M_{ij}=1$ indicates that the location (i, j) is drivable. Therefore, there are four input features in the embodiments of the disclosure, which are marked as $p_{in}=\{p_1, p_2, \ldots, p_n\}$, $l_{in}=\{l_1, l_2, \ldots, l_n\}$, $d_{in}=\{d_1, d_2, \ldots, d_n\}$ and $r_{in}=r_n$ respectively, where n is an observation length, that is, the length of time of observing the historical trajectory.

Three coder blocks are used to extract the features of different inputs, and then the extracted features are connected and inserted into a decoder block to obtain the final basic features. The coder and the decoder are composed of several convolution and deconvolution layers respectively.

In the embodiments of the disclosure, first of all, the rough end points are predicted by using the basic features to reduce the search space of the candidate trajectories. Then, the candidate trajectories are generated by two steps. In the embodiments of the disclosure, the possible end points, namely the estimated end points which are expressed as $p_{ep}=\{(x_e+step*i, y_e+step*j)\}_{i,j\in[-grid,grid]}$, are traversed by drawing grids around the predicted end points, where $p_{ep}$ is a possible end point set, namely an estimated end point set, $p_e=(x_e, y_e)$ is the coordinates of the predicted reference end point, and "step" and "grid" represent respectively the step length and the total number of traversing.

Figure 4A:
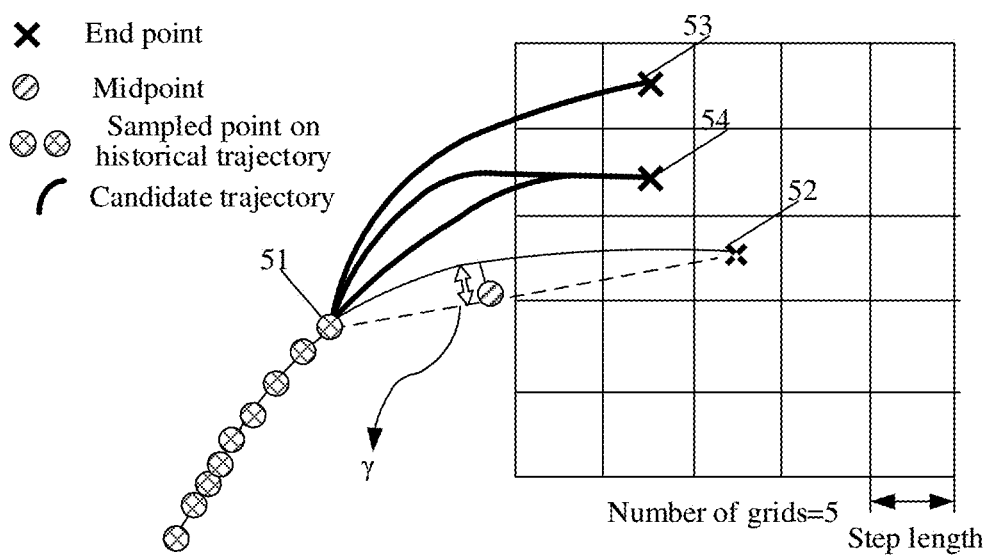
FIG. 4A illustrates a schematic structural diagram of generating candidate trajectories according to embodiments of the disclosure.
Figure 4B:
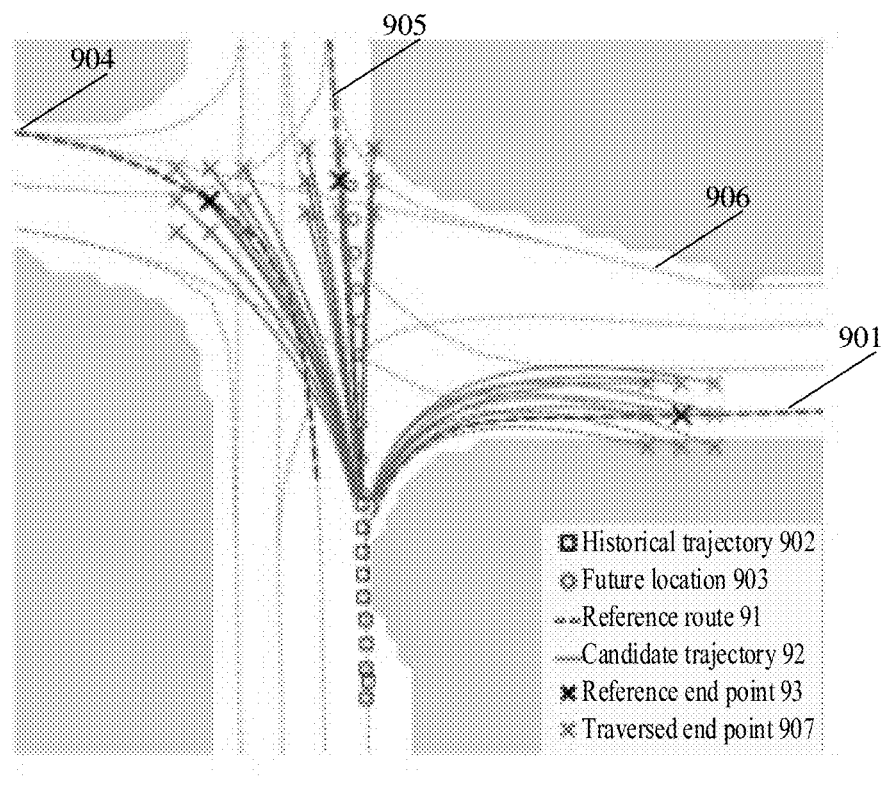
FIG. 4B illustrates a schematic flowchart of generating candidate trajectories on multiple reference routes according to embodiments of the disclosure.

In the embodiments of the disclosure, a group of cubic curves may actually be fitted based on the input point $p_{in}$ and the estimated end point $(x_{pe},y_{pe})$. However, it is found in the embodiments of the disclosure that $p_{in}$ and $(x_{pe}, y_{pe})$ alone are sometimes insufficient to generate some candidate curves, for example, in a curve trajectory, all points in the input point $p_{in}$ are collinear. Therefore, in the embodiments of the disclosure, γ is defined as the distance from the midpoint of the candidate trajectory to the connection line between the last input point and the end point, to control the bending degree of the curve. As illustrated in FIG. 4A, a manner for determining the candidate trajectories on a reference route is provided. Point 51 represents the last sampled point on the historical trajectory. Point 52 represents the reference end point predicted based on historical trajectory. Points 53 and 54 represent respectively the centers of the grids divided within the preset area of the point 52, namely the estimated end points. γ is the distance from the midpoint of the connection line between the point 51 and the point 52 to the candidate trajectories. The magnitude of γ is preset (for example, it is set as a value in (−2 m, 2 m). In this way, multiple candidate trajectories (that is, the candidate trajectory set including multiple candidate trajectories) with different bending degrees may be determined according to the value of γ, the estimated end points and the last sampled point on the historical trajectory. FIG. 4B illustrates a schematic flowchart of generating candidate trajectories on multiple reference routes according to embodiments of the disclosure. As illustrated in FIG. 4B, since candidate trajectory generation strongly depends on the regressed end point in the first stage, the multi-modality of the generated candidate trajectories may be weak. Because roads have strict constraints on the vehicle, the road information is used to generate multiple end points in multi-modal candidate trajectory generation. It can be seen from FIG. 4B that the vehicle is at a crossing at present, and a group of reference routes 91 (located on each road at the crossing, e.g., reference routes 904, 905, and 906) may be obtained based on the basic information of the road information (such as a lane line 901 (the reference line on the road in FIG. 4B) and a moving direction) and the historical trajectory 902 of the vehicle. These reference routes represent the center lane lines that the vehicle is likely to reach. Therefore, formula (2) may be extended to generate multiple candidate trajectory sets for different reference routes.

In some embodiments, first, the location coordinates of the relative reference end point 93 along the reference route are predicted; then, for each predicted reference end point 93, a grid is created near the reference end point 93 in the form of a grid to surround the reference end point 93, so as to traverse the end points 907; finally, the future end points on each reference route are sampled according to the traversed end points, thus reducing dependence on a single regressed end point and ensuring strong multiple-modality. It can be seen from FIG. 4B that the reference end point beyond the road edge in the candidate trajectory is adjusted, which indicates that this point is unreasonable. Finally, the future locations 903 of the vehicle are determined, and the candidate trajectories 92 are generated for each sampled end point using formula (2).

Here, the candidate trajectories on a reference route may be expressed by formula (2):

$$\text{proposals} = \{f(p_{in}, p'_{ep}, \gamma)\} \tag{2}$$

where f( ) represents a cubic polynomial fitting function, $p'_{ep} \in p_{ep}$ and $\gamma \in [-2,-1,0,2]$.

In the training stage, a binary class label that indicates whether a trajectory is good is assigned to each candidate trajectory. In the embodiments of the disclosure, the average distance from the uniformly sampled points on a ground truth trajectory to the candidate trajectories is defined as a criterion of the candidate trajectories, as shown in formula (3):

$$AD = \frac{1}{N}\sum_{i=1}^{N} \|p_{gt}^i - p_{pp}^i\|, \tag{3}$$

where N is the number of sampled points, $p_{gt}^i$ and $p_{pp}^i$ are the $i^{th}$ sampled points of the ground truth trajectory and the candidate trajectory. In the embodiments of the disclosure, if an Average Distance (AD) value of the candidate trajectory is less than a preset threshold, the candidate trajectory is determined as a positive sample. For example, the preset threshold is 2 m, and the candidate trajectory, the average distance between which and the truth trajectory is less than 2 m, is determined as the positive sample, which indicates that the difference between the candidate trajectory and the truth trajectory is smaller and closer to the ground truth trajectory. The remaining candidate trajectories are potential negative samples. In order to reduce the overwhelming influence of too many negative samples, a method of uniform sampling is used in the embodiments of the disclosure to keep the ratio of the negative samples to the positive samples to be 3:1.

For the correction of the obtained positive and negative samples, the parameterization of two coordinates and one variable is used in the embodiments of the disclosure, as shown in formula (4):

$$\begin{cases} t_x = x_e^{gt} - x_e^{pp} \\ t_y = y_e^{gt} - y_e^{pp}, \\ t_\gamma = \gamma^{gt} - \gamma^{pp} \end{cases} \tag{4}$$

where $(x_e^{gt}, y_e^{gt})$ and $(x_e^{pp}, y_e^{pp})$ are respectively the coordinates of the end points of the ground truth trajectory and the candidate trajectory. $t_x$, $t_y$ and $t_\gamma$ are supervised information.

In the embodiments of the disclosure, multi-task loss function minimization is defined as shown in formula (5):

$$L = \frac{1}{N}\sum_i L_{cls}(c_i, c_i^*) + \frac{\alpha}{N_{pos} + \beta N_{neg}} \sum_i L_{ref}(t_i, t_i^*), \tag{5}$$

where $c_i$ and $t_i$ are the confidence and trajectory parameter of the candidate trajectory, $c_i^*$ and $t_i^*$ are the confidence and trajectory parameter of the corresponding ground truth trajectory, and α is the weight. $L_{cls}$ represents the loss function of two types of samples. In the embodiment, the cross entropy loss of the two types of samples is used as $L_{cls}$. $L_{ref}$ represents the loss function of the corrected trajectory parameter. In the embodiments of the disclosure, the Euclidean loss is used as $L_{ref}$. Due to the multi-modal characteristics of the trajectory, in the embodiments of the disclosure, the positive samples and a portion of randomly sampled negative samples are used to calculate and refine the loss function, and β is used to control the ratio of sampled negative samples.

The future trajectory of the vehicle is not only influenced by history, but also limited by rules, such as road structure and control information. In combination with these rules, a more reliable prediction of the future target trajectory may be made. The knowledge candidate trajectory network of the embodiments of the disclosure may solve these problems effectively and obtain a very reliable predicted trajectory.

In the embodiments of the disclosure, a polygonal area composed of the lane lines that the vehicle may travel in the future, namely the freespace, may be determined in combination with the historical moving trajectory and high-resolution maps. In some embodiments, the basic rule for determining the freespace is that the vehicle can only travel on the lanes in the same direction.

In some embodiments, if there is a turn signal (the intention of the input trajectory or light), the polygonal area is the destination lane; otherwise the freespace is composed of all possible lanes. After the freespace is obtained, the embodiments of the disclosure propose two methods for implementing road constraints, for example, a method of not ignoring the candidate trajectories outside the freespace and a method of ignoring the candidate trajectories outside the freespace. In the method of not ignoring the candidate trajectories outside the freespace, the freespace is used as an input function and implicitly supervises the model to learn such rules. In the embodiments of the disclosure, the candidate trajectories outside the freespace are ignored to explicitly constrain the candidate trajectories in inference. For ignoring the candidate trajectories outside the freespace, the candidate trajectories outside the freespace are ignored during generation. Moreover, in the embodiments of the disclosure, the candidate trajectories are constrained by attenuating classification scores of the candidate trajectories outside the freespace during the test, as shown in formula (6):

$$\text{score} = \text{score} * e^{\frac{-r^2}{\sigma^2}}, \quad (6)$$

where r represents the probability that a candidate trajectory points to the outside of the freespace, and σ represents an attenuation factor.

The control information is a clear signal instructing the vehicle to notice. Similar to road constraints, the control information will restrict the freespace to a certain direction, so as to further narrow the freespace generated by the road constraints. For the vehicle at the road junction, the freespace is fully open to four directions, and in the embodiments of the disclosure, the prompt of the turn light is used to select a unique road as a drivable mask, thereby reducing the drivable mask. For the vehicle on the lane, in the embodiments of the disclosure, the scores of the corresponding candidate trajectories may also be attenuated during the test, as shown in formula 6.

The embodiments of the disclosure redefine the trajectory of a vehicle to predict the vehicle motion reliably. In this way, the moving trend and intention of the vehicle is reflected well and the prediction is robust to noise. Moreover, a large number of data sets with rich information are collected, and experiments on the data sets prove the effectiveness of the method provided by the embodiments of the disclosure. At the same time, more normalized rules, such as the traffic lights, may easily be extended to the solutions of the embodiments of the disclosure.

It is to be noted that the descriptions about the apparatus embodiments are similar to descriptions about the method embodiments and beneficial effects similar to those of the method embodiments are achieved. Technical details undisclosed in the apparatus embodiments of the disclosure may be understood with reference to the descriptions about the method embodiments of the disclosure.

It is to be noted that, in the embodiments of the disclosure, when being implemented in form of software function module and sold or used as an independent product, the method for trajectory prediction may also be stored in a computer-readable storage medium. Based on such an understanding, the technical solutions of the embodiments of the disclosure substantially or parts making contributions to the conventional art may be embodied in form of software product, and the computer software product is stored in a storage medium, including multiple instructions configured to enable a computer device (which may be a terminal, a server, and the like) to execute all or part of the method in each embodiment of the disclosure. The storage medium includes: various media capable of storing program codes such as a USB flash disk, a mobile hard disk, a Read Only Memory (ROM), a magnetic disk or an optical disk. Therefore, the embodiments of the disclosure are not limited to any specific hardware and software combination.

Figure 5:
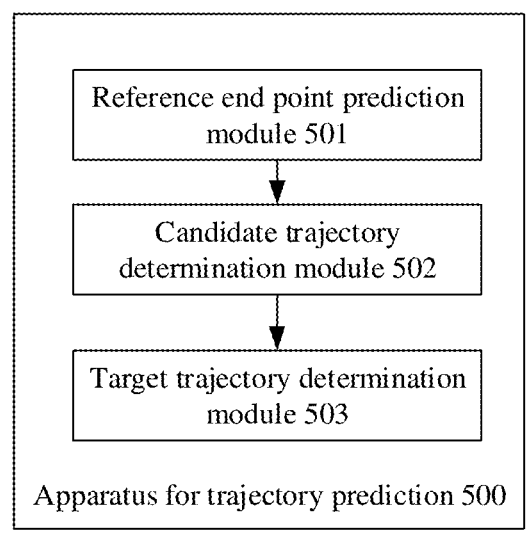
FIG. 5 illustrates a schematic structural diagram of composition of an apparatus for trajectory prediction according to embodiments of the disclosure.

The embodiments of the disclosure provide an apparatus for trajectory prediction. FIG. 5 illustrates a schematic structural diagram of composition of an apparatus for trajectory prediction according to an embodiment of the disclosure. As illustrated in FIG. 5, the apparatus 500 may include: a reference end point prediction module 501, a candidate trajectory determination module 502, and a target trajectory determination module 503.

The reference end point prediction module 501 is configured to determine location information of a reference end point of a moving object according to location information of the moving object.

Here, the reference end point prediction module 501 may be any method, as long as it is based on the location information of the moving object.

For example, the method for determining the end point using the location information and a machine learning model such as feature learning or reinforcement learning may be used. The machine learning model may at least have the location information of the moving object as input and output the end point or a trajectory containing the end point. In this method, the reference end point prediction module 501 may determine the end point by using the location information and surrounding environment information of the moving object as the input of the machine learning model. Alternatively, the reference end point prediction module 501 may use the location information of the moving object as the input of the machine learning model, and determine the end point by using the output of the machine learning model and the surrounding environment information of the moving object. In addition, the reference end point prediction module 501 may use the location information of the moving object and the surrounding environment information of the moving object as the input of the machine learning model, and determine the end point by using the output of the neural network and the surrounding environment information of the moving object. For example, the reference end point prediction module 501 may determine a trajectory of the moving object as the output of the machine learning model, adjust the determined trajectory based on the surrounding environment information of the moving object, so that the trajectory overlaps with no pedestrian or sidewalk, and determines an end point contained in the adjusted trajectory.

In another method for determining the end point, a method using the location information and a kinematic model of the moving object may be used. In this method, the reference end point prediction module 501 may determine the end point by using the location information, the kinematic model of the moving object and the surrounding environment information of the moving object.

The candidate trajectory determination module 502 is configured to determine a candidate trajectory set including multiple candidate trajectories according to the location information of the moving object and the location information of the reference end point. The location information of an end point of each candidate trajectory is different from the location information of the reference end point. The target trajectory determination module 503 is configured to determine the target trajectory of the moving object from the candidate trajectory set.

In some embodiments, the location information of the moving object includes: time sequence location information of the moving object, or a historical trajectory of the moving object.

In some embodiments, the reference end point includes a point other than preset limit types. The preset limit types include at least one of: road edge points, obstacles, or pedestrians.

In some embodiments, the reference end point prediction module 501 may include: an environment information obtaining submodule and a first reference end point prediction submodule. The environment information obtaining submodule is configured to obtain environment information of the moving object according to the location information of the moving object. The environment information includes at least one of: road information, obstacle information, pedestrian information, traffic light information, traffic sign information, traffic rule information or information about other moving objects. The first reference end point prediction submodule is configured to determine the location information of the reference end point of the moving object according to the environment information.

In some embodiments, the environment information obtaining submodule is further configured to: determine the environment information according to image information acquired by the moving object; or the environment information according to communication information received by the moving object, wherein the communication information represents a present environment.

In some embodiments, the reference end point prediction module 501 may include: a reference route determination submodule and a second reference end point prediction submodule. The reference route determination submodule is configured to determine at least one reference route of the moving object according to the location information of the moving object. The second reference end point prediction submodule is configured to determine the location information of the reference end point according to the at least one reference route.

In some embodiments, the second reference end point prediction submodule may include: a freespace determination unit and a reference end point prediction unit. The freespace determination unit is configured to determine a freespace of each of the at least one reference route. The reference end point prediction unit is configured to determine the location information of the reference end point of the moving object in the freespace according to the location information of the moving object.

In some embodiments, the reference end point prediction module 501 may include: a road junction determination submodule and a submodule for determining multiple reference end points. The road junction determination submodule is configured to determine road junction information of a road where the moving object is located according to the location information of the moving object. The submodule for determining multiple reference end points is configured to: in response to the road junction information indicating that at least two road junctions exist, determine location information of multiple reference end points of the moving object, wherein each of the at least two road junctions corresponds to a respective different reference end point.

In some embodiments, the target trajectory determination module 503 may include: a confidence determination submodule and a target trajectory determination submodule. The confidence determination submodule is configured to determine confidences corresponding to the multiple candidate trajectories in the candidate trajectory set. The target trajectory determination submodule is configured to determine the target trajectory of the moving object from the candidate trajectory set according to travel information of the moving object and the confidences.

In some embodiments, the apparatus may further include: a correction value determination module, a trajectory adjustment module, and an updated target trajectory determination module. The correction value determination module is configured to determine a trajectory parameter correction value for at least one candidate trajectory in the candidate trajectory set. The trajectory adjusting module is configured to adjust the at least one candidate trajectory in the candidate trajectory set according to the trajectory parameter correction value to obtain an updated candidate trajectory set. The updated target trajectory determination module is configured to determine the target trajectory of the moving object from the updated candidate trajectory set according to the travel information of the moving object and the confidences.

In some embodiments, the updated target trajectory determination module may include: a freespace determination submodule and an updated target trajectory determination submodule. The freespace determination submodule is configured to determine a freespace of the moving object according to at least one of the environment information of the moving object or control information of the moving object. The updated target trajectory determination submodule is configured to determine the target trajectory of the moving object from the updated candidate trajectory set according to the freespace and the confidences.

In some embodiments, the freespace determination submodule may include: a predicted freespace determination unit and a predicted freespace adjustment unit. The predicted freespace determination unit is configured to determine a predicted freespace of the moving object according to the environment information of the moving object. The predicted freespace adjustment unit is configured to adjust the predicted freespace according to the control information of the moving object to obtain the freespace.

In some embodiments, the updated target trajectory determination submodule may include: a target trajectory set determination unit and a target trajectory screening unit. The target trajectory set determination unit is configured to determine, from the updated candidate trajectory set, candidate trajectories contained in the freespace, to obtain a target trajectory set to be determined. The target trajectory screening unit is configured to determine a trajectory with a maximum confidence or a trajectory with a confidence greater than a preset confidence threshold in the target trajectory set as the target trajectory.

In some embodiments, the candidate trajectory determination module 502 may include: an estimated end point determination submodule and a candidate trajectory generation submodule. The estimated end point determination submodule is configured to determine M estimated end points within a preset area containing the reference end point. The candidate trajectory generation submodule is configured to correspondingly generate M×N candidate trajectories according to the location information of the moving object, the M estimated end points and N preset distances to obtain the candidate trajectory set, wherein each of the N preset distances is used for indicating a distance from a midpoint of a connection line between a last sampled point in the location information of the moving object and the reference end point to a respective candidate trajectory, and both M and N are integers greater than 0.

In some embodiments, the estimated end point determination submodule may include: a preset area determination unit and a grid dividing unit. The preset area determination unit is configured to determine the preset area containing the reference end point according to a width of a road where the reference end point is located. The grid dividing unit is configured to divide the preset area containing the reference end point into M grids with a same size, and taking centers of the M grids as the M estimated end points.

In some embodiments, the candidate trajectory generation submodule may include: a midpoint determination unit, a pre-estimated point determination unit, a unit for generating M×N candidate trajectories and a candidate trajectory screening unit. The midpoint determination unit is configured to determine the midpoint of the connection line between the last sampled point in the location information of the moving object and the reference end point. The pre-estimated point determination unit is configured to determine N pre-estimated points according to the N preset distances and the midpoint. The unit for generating M×N candidate trajectories is configured to generate M×N candidate trajectories according to the N pre-estimated points and the M estimated end points. The candidate trajectory screening unit is configured to screen the M×N candidate trajectories according to the environment information to obtain the candidate trajectory set.

In some embodiments, the reference end point prediction module 501 may include: a candidate end point prediction submodule and a reference end point determination submodule. The candidate end point prediction submodule is configured to predict a candidate end point of the moving object by a neural network according to the location information of the moving object. The reference end point determination submodule is configured to determine the location information of the reference end point of the moving object according to the candidate end point.

In some embodiments, the reference end point prediction submodule is further configured to input the location information of the moving object into a first neural network to predict a first candidate end point of the moving object. The reference end point determination submodule is further configured to determine the location information of the reference end point of the moving object according to the first candidate end point and environment information of the moving object.

In some embodiments, the candidate end point prediction submodule is further configured to input the location information of the moving object and environment information of the moving object into a second neural network to predict a second candidate end point of the moving object. The reference end point determination submodule is further configured to determine the location information of the reference end point of the moving object according to the second candidate end point and the environment information of the moving object.

In some embodiments, the apparatus may further include: a network training module, configured to train the neural network. The network training module may include: a first network input submodule, a first prediction loss determination submodule and a first network parameter adjustment submodule. The first network input submodule is configured to input at least one of the location information of the moving object, or the location information of the moving object and a road image acquired by the moving object into the neural network to obtain a first predicted end point. The first prediction loss determination submodule is configured to determine a first prediction loss of the neural network about the first predicted end point according to a ground truth trajectory of the moving object. The first network parameter adjustment submodule is configured to adjust a network parameter of the neural network according to the first prediction loss to train the neural network.

In some embodiments, the network training module may further include: a second network input submodule, a second prediction loss determination submodule, a deviation determination submodule, a second prediction loss adjustment submodule, and a second network parameter adjustment submodule. The second network input submodule is configured to input the location information of the moving object and map information corresponding to the location information of the moving object into the neural network to obtain a second predicted end point. The second prediction loss determination submodule is configured to determine a second prediction loss of the neural network about the second predicted end point according to a ground truth trajectory of the moving object. The deviation determination submodule is configured to determine a deviation between the second predicted end point and a preset constraint. The second prediction loss adjustment submodule is configured to adjust the second prediction loss about the second predicted end point according to the deviation to obtain a third prediction loss. The second network parameter adjustment submodule is configured to adjust a network parameter of the neural network according to the third prediction loss to train the neural network.

Correspondingly, the embodiments of the disclosure further provide a computer program product including thereon computer-executable instructions that, when executed, implement the operations in the method for trajectory prediction provided in the embodiments of the disclosure.

Correspondingly, the embodiments of the disclosure also provide a computer storage medium having stored thereon computer-executable instructions that, when executed by a processor, cause the processor to implement the operations in the method for trajectory prediction provided in the embodiments of the disclosure.

Figure 6:
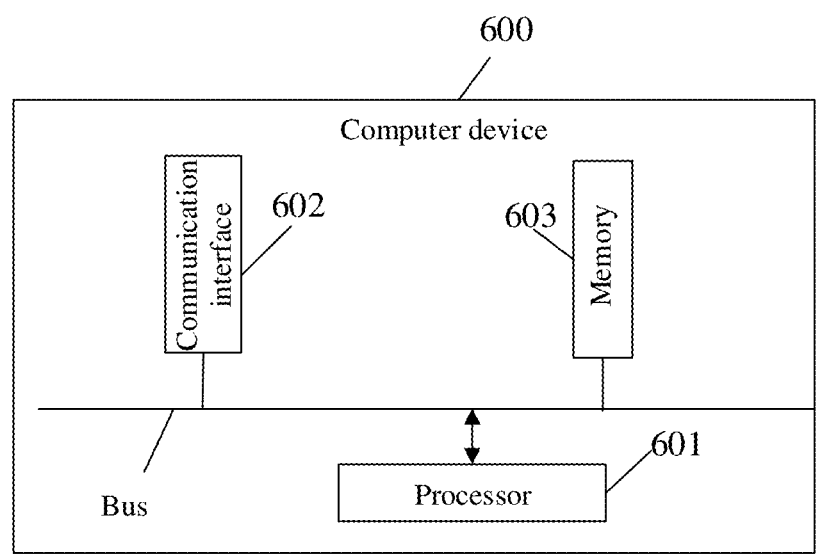
FIG. 6 illustrates a schematic structural diagram of composition of a computer device according to embodiments of the disclosure.

Accordingly, the embodiments of the disclosure provide a computer device. FIG. 6 illustrates a schematic structural diagram of composition of a computer device according to embodiments of the disclosure. As illustrated in FIG. 6, the device 600 may include: a processor 601, at least one communication bus, a communication interface 602, at least one external communication interface and a memory 603. The communication interface 602 is configured to implement connection communication between these components. The communication interface 602 may include a display screen, and the external communication interface may include a standard wired interface and a standard wireless interface. The processor 601 is configured to execute an image processing program in the memory to implement the operations in the method for trajectory prediction provided in the above embodiment.

The above descriptions about the embodiments of the apparatus for trajectory prediction, the computer device, and the storage medium are similar to the descriptions about the method embodiment, and technical descriptions and beneficial effects are similar to those of the corresponding method embodiments. Due to the space limitation, references can be made to the contents in the method embodiments. Technical details undisclosed in the embodiments of the apparatus for trajectory prediction, computer device and storage medium of the disclosure may be understood with reference to the descriptions about the method embodiments of the disclosure.

It is to be understood that "one embodiment" and "an embodiment" mentioned in the whole specification mean that specific features, structures or characteristics related to the embodiment is included in at least one embodiment of the application. Therefore, "in one embodiment" or "in an embodiment" appearing at any place of the whole specification does not always refer to the same embodiment. In addition, these specific features, structures or characteristics may be combined in one or more embodiments in any proper manner. It is to be understood that, in various embodiments of the disclosure, a magnitude of a serial number of each process does not mean an execution sequence and the execution sequence of each process should be determined by its function and an internal logic, and should not form any limit to an implementation process of the embodiments of the disclosure. The serial numbers of the embodiments of the disclosure are used to represent superiority-inferiority of the embodiments but only for description.

It is to be noted that terms "include" and "contain" or any other variant thereof is intended to cover nonexclusive inclusions herein, so that a process, method, object or device including a series of components not only includes those components but also includes other components which are not clearly listed or further includes components intrinsic to the process, the method, the object or the device. Without more limitations, an element defined by the statement "including a/an . . . " does not exclude existence of the same other components in a process, method, object or device including the element.

In some embodiments provided in the disclosure, it is to be understood that the disclosed device and method may be implemented in another manner. The device embodiment described above is only schematic, and for example, division of the units is only logic function division, and other division manners may be adopted during practical implementation. For example, multiple units or components may be combined or integrated into another system, or some features may be neglected or not executed. In addition, coupling or direct coupling or communication connection between various displayed or discussed components may be indirect coupling or communication connection, implemented through some interfaces, devices or units, and may be electrical and mechanical or in other forms.

The units described as separate parts may or may not be physically separated, and parts displayed as units may or may not be physical units, and namely may be located in the same place, or may also be distributed to multiple network units. Some of all of the units may be selected according to a practical requirement to achieve the purposes of the solutions of the embodiments.

In addition, each functional unit in each embodiment of the disclosure may be integrated into a processing unit. Each unit may also serve as an independent unit or two or more than two units may be integrated into a unit. The integrated unit may be implemented in a hardware form and may also be implemented in form of hardware and software functional unit.

Those of ordinary skill in the art should know that all or some of the operations of the method embodiment may be implemented by related hardware instructed through a program. The program may be stored in a computer-readable storage medium. The program is executed to execute the operations of the method embodiment. The storage medium includes: various media capable of storing program codes such as a mobile storage device, a ROM, a magnetic disk or a compact disc.

Alternatively, when being implemented in form of software function module and sold or used as an independent product, the integrated unit of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including multiple instructions configured to enable a computing device (which may be a personal computer, a server, a network device or the like) to execute all or part of the method in each embodiment of the disclosure. The storage medium includes: various media capable of storing program codes such as a mobile hard disk, a ROM, a magnetic disk or a compact disc.

The above is only detailed description of the disclosure and not intended to limit the protection scope of the disclosure; any change or replacement that would occur to those skilled in the art easily in the scope of technologies disclosed by the disclosure shall fall within the protection scope of the disclosure. Therefore, the scope of protection of the disclosure shall be subject to the scope of protection of the claims.

INDUSTRIAL APPLICABILITY

The embodiments of the disclosure provide a method and apparatus for trajectory prediction, a device and a storage medium. The method includes that: location information of a reference end point of a moving object is determined according to location information of the moving object; a candidate trajectory set including multiple candidate trajectories is determined according to the location information of the moving object and the location information of the reference end point, location information of an end point of each candidate trajectory being different from the location information of the reference end point; and a target trajectory of the moving object is determined from the candidate trajectory set. In this way, the future motion trajectory of the moving object can be estimated more accurately.

The invention claimed is:

1. A method for trajectory prediction, performed by an electronic device, and comprising:
   determining location information of a reference end point of a moving object according to location information of the moving object;
   determining a candidate trajectory set comprising multiple candidate trajectories according to the location information of the moving object and the location information of the reference end point, comprising:
      determining M estimated end points within a preset area containing the reference end point; and
      correspondingly generating M×N candidate trajectories according to the location information of the moving object, the M estimated end points and N preset distances to obtain the candidate trajectory set, wherein:
         each of the N preset distances is used for indicating a distance from a midpoint of a connection line between a last sampled point in the location information of the moving object and the reference end point to a respective candidate trajectory, and both M and N are integers greater than 0, and
         location information of end points of at least two of the multiple candidate trajectories is different from the location information of the reference end point; and
   determining a target trajectory of the moving object from the candidate trajectory set.

2. The method of claim 1, wherein determining the location information of the reference end point of the moving object according to the location information of the moving object comprises:

obtaining environment information of the moving object according to the location information of the moving object, wherein the environment information comprises at least one of: road information, obstacle information, pedestrian information, traffic light information, traffic sign information, traffic rule information or information about other moving objects; and determining the location information of the reference end point of the moving object according to the environment information.

3. The method of claim 2, wherein obtaining the environment information of the moving object according to the location information of the moving object comprises at least one of:

determining the environment information according to image information acquired by the moving object; or determining the environment information according to communication information received by the moving object, wherein the communication information represents a present environment.

4. The method of claim 1, wherein determining the location information of the reference end point of the moving object according to the location information of the moving object comprises:

determining at least one reference route of the moving object according to the location information of the moving object; and determining the location information of the reference end point according to the at least one reference route.

5. The method of claim 4, wherein determining the location information of the reference end point according to the at least one reference route comprises:

determining a freespace of each of the at least one reference route; and determining the location information of the reference end point of the moving object in the freespace according to the location information of the moving object.

6. The method of claim 1, wherein determining the location information of the reference end point of the moving object according to the location information of the moving object comprises:

determining road junction information of a road where the moving object is located according to the location information of the moving object; and in response to the road junction information indicating that at least two road junctions exist, determining location information of multiple reference end points of the moving object, wherein each of the at least two road junctions corresponds to a respective different reference end point.

7. The method of claim 1, wherein determining the target trajectory of the moving object from the candidate trajectory set comprises:

determining confidences corresponding to the multiple candidate trajectories in the candidate trajectory set; and determining the target trajectory of the moving object from the candidate trajectory set according to travel information of the moving object and the confidences.

8. The method of claim 7, wherein before determining the target trajectory of the moving object from the candidate trajectory set according to the travel information of the moving object and the confidences, the method further comprises:

determining a trajectory parameter correction value for at least one candidate trajectory in the candidate trajectory set;

adjusting the at least one candidate trajectory in the candidate trajectory set according to the trajectory parameter correction value to obtain an updated candidate trajectory set; and determining the target trajectory of the moving object from the updated candidate trajectory set according to the travel information of the moving object and the confidences.

9. The method of claim 8, wherein determining the target trajectory of the moving object from the updated candidate trajectory set according to the travel information of the moving object and the confidences comprises:

determining a freespace of the moving object according to at least one of environment information of the moving object or control information of the moving object; and determining the target trajectory of the moving object from the updated candidate trajectory set according to the freespace and the confidences.

10. The method of claim 9, wherein determining the freespace of the moving object according to at least one of the environment information of the moving object or the control information of the moving object comprises:

determining a predicted freespace of the moving object according to the environment information of the moving object; and adjusting the predicted freespace according to the control information of the moving object to obtain the freespace.

11. The method of claim 9, wherein determining the target trajectory of the moving object from the updated candidate trajectory set according to the freespace and the confidences comprises:

determining, from the updated candidate trajectory set, candidate trajectories contained in the freespace, to obtain a target trajectory set to be determined; and determining a trajectory with a maximum confidence or a trajectory with a confidence greater than a preset confidence threshold in the target trajectory set as the target trajectory.

12. The method of claim 1, wherein determining the M estimated end points within the preset area containing the reference end point comprises:

determining the preset area containing the reference end point according to a width of a road where the reference end point is located; and dividing the preset area containing the reference end point into M grids with a predetermined size, and taking centers of the M grids as the M estimated end points.

13. The method of claim 1, wherein correspondingly generating the M×N candidate trajectories according to the location information of the moving object, the M estimated end points and the N preset distances to obtain the candidate trajectory set comprises:

determining the midpoint of the connection line between the last sampled point in the location information of the moving object and the reference end point;

determining N pre-estimated points according to the N preset distances and the midpoint;

generating the M×N candidate trajectories according to the N pre-estimated points and the M estimated end points; and screening the M×N candidate trajectories according to environment information to obtain the candidate trajectory set.

14. The method of claim 1, wherein determining the location information of the reference end point of the moving object according to the location information of the moving object comprises:
    predicting a candidate end point of the moving object by a neural network according to the location information of the moving object; and
    determining the location information of the reference end point of the moving object according to the candidate end point.

15. The method of claim 14, wherein predicting the candidate end point of the moving object by the neural network according to the location information of the moving object comprises:
    inputting the location information of the moving object into a first neural network to predict a first candidate end point of the moving object; and
    determining the location information of the reference end point of the moving object according to the candidate end point comprises:
        determining the location information of the reference end point of the moving object according to the first candidate end point and environment information of the moving object.

16. The method of claim 14, wherein predicting the candidate end point of the moving object by the neural network according to the location information of the moving object comprises:
    inputting the location information of the moving object and environment information of the moving object into a second neural network to predict a second candidate end point of the moving object; and
    determining the location information of the reference end point of the moving object according to the candidate end point comprises:
        determining the location information of the reference end point of the moving object according to the second candidate end point and the environment information of the moving object.

17. The method of claim 14, wherein a method for training the neural network comprises:
    inputting at least one of the location information of the moving object, or the location information of the moving object and a road image acquired by the moving object into the neural network to obtain a first predicted end point;
    determining a first prediction loss of the neural network about the first predicted end point according to a ground truth trajectory of the moving object; and
    adjusting a network parameter of the neural network according to the first prediction loss to train the neural network.

18. A non-transitory computer storage medium having stored thereon computer-executable instructions that, when executed, implement following:
    determining location information of a reference end point of a moving object according to location information of the moving object;
    determining a candidate trajectory set comprising multiple candidate trajectories according to the location information of the moving object and the location information of the reference end point, comprising:
        determining M estimated end points within a preset area containing the reference end point; and
        correspondingly generating M×N candidate trajectories according to the location information of the moving object, the M estimated end points and N preset distances to obtain the candidate trajectory set, wherein:
            each of the N preset distances is used for indicating a distance from a midpoint of a connection line between a last sampled point in the location information of the moving object and the reference end point to a respective candidate trajectory, and both M and N are integers greater than 0, and
            location information of end points of at least two of the multiple candidate trajectories is different from the location information of the reference end point; and
    determining a target trajectory of the moving object from the candidate trajectory set.

19. A method for trajectory prediction, performed by an electronic device, and comprising:
    determining location information of a reference end point of a moving object according to location information of the moving object;
    determining a candidate trajectory set comprising multiple candidate trajectories according to the location information of the moving object and the location information of the reference end point, wherein location information of end points of at least two of the multiple candidate trajectories is different from the location information of the reference end point; and
    determining a target trajectory of the moving object from the candidate trajectory set, comprising:
        determining confidences corresponding to the multiple candidate trajectories in the candidate trajectory set; and
        determining a trajectory parameter correction value for at least one candidate trajectory in the candidate trajectory set;
        adjusting the at least one candidate trajectory in the candidate trajectory set according to the trajectory parameter correction value to obtain an updated candidate trajectory set; and
        determining the target trajectory of the moving object from the updated candidate trajectory set according to travel information of the moving object and the confidences, comprising:
            determining a freespace of the moving object according to at least one of environment information of the moving object or control information of the moving object; and
            determining the target trajectory of the moving object from the updated candidate trajectory set according to the freespace and the confidences.

20. The method of claim 19, wherein determining the location information of the reference end point of the moving object according to the location information of the moving object comprises:
    determining road junction information of a road where the moving object is located according to the location information of the moving object; and
    in response to the road junction information indicating that at least two road junctions exist, determining location information of multiple reference end points of the moving object, wherein each of the at least two road junctions corresponds to a respective different reference end point.

* * * * *